US011904613B2

(12) United States Patent
Nakazawa et al.

(10) Patent No.: US 11,904,613 B2
(45) Date of Patent: Feb. 20, 2024

(54) INKJET RECORDING DEVICE MAINTAINING VALVE AT CLOSING POSITION TO CLOSE AIR COMMUNICATION OPENING FORMED IN INK STORAGE PORTION DURING EXECUTION OF PRINTING PROCESS

(71) Applicant: BROTHER KOGYO KABUSHIKI KAISHA, Nagoya (JP)

(72) Inventors: Fumio Nakazawa, Okazaki (JP); Yoshinori Osakabe, Seto (JP); Taichi Shirono, Nagoya (JP); Sosuke Kuroyanagi, Nishio (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/218,263

(22) Filed: Mar. 31, 2021

(65) Prior Publication Data

US 2021/0300043 A1 Sep. 30, 2021

(30) Foreign Application Priority Data

Mar. 31, 2020 (JP) ................................ 2020-062032

(51) Int. Cl.
*B41J 2/175* (2006.01)
*B41J 2/165* (2006.01)

(52) U.S. Cl.
CPC ........ *B41J 2/17556* (2013.01); *B41J 2/16505* (2013.01); *B41J 2/175* (2013.01)

(58) Field of Classification Search
CPC .... B41J 2/17556; B41J 2/16505; B41J 2/175; B41J 2/16523; B41J 2/16508
See application file for complete search history.

(56) References Cited

U.S. PATENT DOCUMENTS 4,178,595 A * 12/1979 Jinnai .................. B41J 2/17566 347/7
2004/0061748 A1 4/2004 Kuwahara et al.
(Continued)

FOREIGN PATENT DOCUMENTS

CN 1223933 A 7/1999
CN 1496842 A 5/2004
(Continued)

OTHER PUBLICATIONS

International Search Report and Written Opinion issued in corresponding International Patent Application No. PCT/JP2021/013715, dated May 25, 2021.
(Continued)

*Primary Examiner* — Geoffrey S Mruk
(74) *Attorney, Agent, or Firm* — Merchant & Gould P.C.

(57) ABSTRACT

There is provided an inkjet recording device including a head, a support member, a storage portion, a valve, an actuator, and a controller. The head includes a nozzle and is configured to eject ink from the nozzle. The support member supports the head. The storage portion storing therein ink. The storage portion has a part positioned above the nozzle. The storage portion has an air communication opening allowing an interior of the storage portion to be communicated with an outside of the storage portion. The valve is movable between an opening position in which the valve opens the air communication opening and a closing position in which the valve closes the air communication opening. The actuator is configured to move the valve. The controller configured to control, while the head is ejecting ink from the nozzle toward a recording medium, the actuator to maintain the valve at the closing position.

18 Claims, 9 Drawing Sheets

(56) References Cited

U.S. PATENT DOCUMENTS

| | | | |
|---|---|---|---|
| 2004/0218026 | A1 | 11/2004 | Matsushita et al. |
| 2005/0212883 | A1 | 9/2005 | Okamoto |
| 2008/0170098 | A1 | 7/2008 | Kojima et al. |
| 2009/0174735 | A1 | 7/2009 | Yamada |
| 2011/0187772 | A1 | 8/2011 | Tomoguchi et al. |
| 2014/0184709 | A1 | 7/2014 | Qian et al. |
| 2017/0151802 | A1 | 6/2017 | Toba et al. |
| 2017/0217186 | A1 | 8/2017 | Arai |
| 2018/0178512 | A1 | 6/2018 | Kobayashi et al. |
| 2018/0207943 | A1 | 7/2018 | Horade |
| 2018/0311967 | A1 | 11/2018 | Matsumura |

FOREIGN PATENT DOCUMENTS

| | | | |
|---|---|---|---|
| CN | 1537725 | A | 10/2004 |
| CN | 1672951 | A | 9/2005 |
| CN | 102834267 | A | 12/2012 |
| CN | 103874582 | A | 6/2014 |
| CN | 107020812 | A | 8/2017 |
| CN | 108407467 | A | 8/2018 |
| CN | 108790402 | A | 11/2018 |
| EP | 2 759 408 | A1 | 7/2014 |
| JP | 54-65536 | A | 5/1979 |
| JP | 2008-168584 | A | 7/2008 |
| JP | 2011-140197 | A | 7/2011 |
| JP | 2014-151589 | A | 8/2014 |
| JP | 2017-094658 | A | 6/2017 |
| JP | 2018-108647 | A | 7/2018 |
| JP | 2018-108667 | A | 7/2018 |
| TW | 200528294 | A | 9/2005 |
| WO | 2005/075203 | A1 | 8/2005 |

OTHER PUBLICATIONS

Office Action issued in corresponding Japanese Patent Application No. 2020-062032, dated Sep. 19, 2023.

Office Action issued in corresponding Chinese Patent Application No. 202180025644.4, dated Nov. 8, 2023.

* cited by examiner

INKJET RECORDING DEVICE MAINTAINING VALVE AT CLOSING POSITION TO CLOSE AIR COMMUNICATION OPENING FORMED IN INK STORAGE PORTION DURING EXECUTION OF PRINTING PROCESS

CROSS REFERENCE TO RELATED APPLICATION

This application claims priority from Japanese Patent Application No. 2020-062032 filed Mar. 31, 2020. The entire content of the priority application is incorporated herein by reference.

TECHNICAL FIELD

The present disclosure relates to an inkjet recording device for recording an image on a recording medium by ejecting ink thereto.

BACKGROUND

In an inkjet recording device provided with a head, a meniscus that has a concave shape as viewed from the outside is formed in each nozzle of the head in order to stabilize ink ejection.

In an inkjet recording device in which ink is supplied to a head from an ink storage portion provided in a carriage on which the head is mounted, a concave meniscus is formed in each nozzle by setting an interior of the ink storage portion to negative pressure. Here, excessive negative pressure may result in the meniscus being broken. Therefore, the negative pressure of the interior of the ink storage portion needs to be maintained within a proper pressure range.

Japanese Patent Application Publication No. 2017-94658 discloses a printer including a valve. The valve is opened when the level of the negative pressure in an ink storage portion becomes great, thereby introducing air into the interior of the ink storage portion. When this introduction of air returns the level of the negative pressure into a proper pressure range, the valve is closed. In this way, in the disclosed printer, the valve is automatically opened and closed based on the level of the negative pressure in the ink storage portion to maintain the internal negative pressure within the proper range.

SUMMARY

However, with the conventional inkjet recording device described above, ink leakage may occur by permeation of ink into a recording medium from the nozzles due to contact of the nozzles with the recording medium. This contact may occur when jamming of the recording medium occurs in the inkjet recording device during an image recordation to the recording medium. The ink leakage causes reduction in amount of ink in the ink storage portion, which leads to pressure decrease (elevation in the level of negative pressure) in the storage portion. Hence, the permeation of ink into the recording medium can be suppressed.

However, according to the printer disclosed in the '658 Publication, the valve is temporarily opened in response to decrease in the internal pressure (rise in the level of negative pressure), so that the level of the pressure in the storage portion is returned into the proper pressure range. As a result, the permeation of ink in the nozzles into the recording medium is again accelerated. As such, according to the disclosed printer, ink may be endlessly leaked in case of occurrence of ink permeation into the recording medium.

In view of the foregoing, it is an object of the disclosure to provide an inkjet recording device capable of reducing ink leakage from nozzles.

In order to attain the above and other objects, according to one aspect, the disclosure provides an inkjet recording device comprising: a head, a support member, a storage portion, a valve, an actuator, and a controller. The head includes a nozzle and is configured to eject ink from the nozzle. The support member supports the head. The storage portion is configured to store therein ink. The storage portion has a part positioned above the nozzle. The storage portion has an air communication opening allowing an interior of the storage portion to be communicated with an outside of the storage portion. The valve is movable between an opening position in which the valve opens the air communication opening and a closing position in which the valve closes the air communication opening. The actuator is configured to move the valve. The controller configured to control, while the head is ejecting ink from the nozzle toward a recording medium, the actuator to maintain the valve at the closing position.

BRIEF DESCRIPTION OF THE DRAWINGS

The particular features and advantages of the embodiment (s) as well as other objects will become apparent from the following description taken in connection with the accompanying drawings, in which.

DETAILED DESCRIPTION

Figure 1:
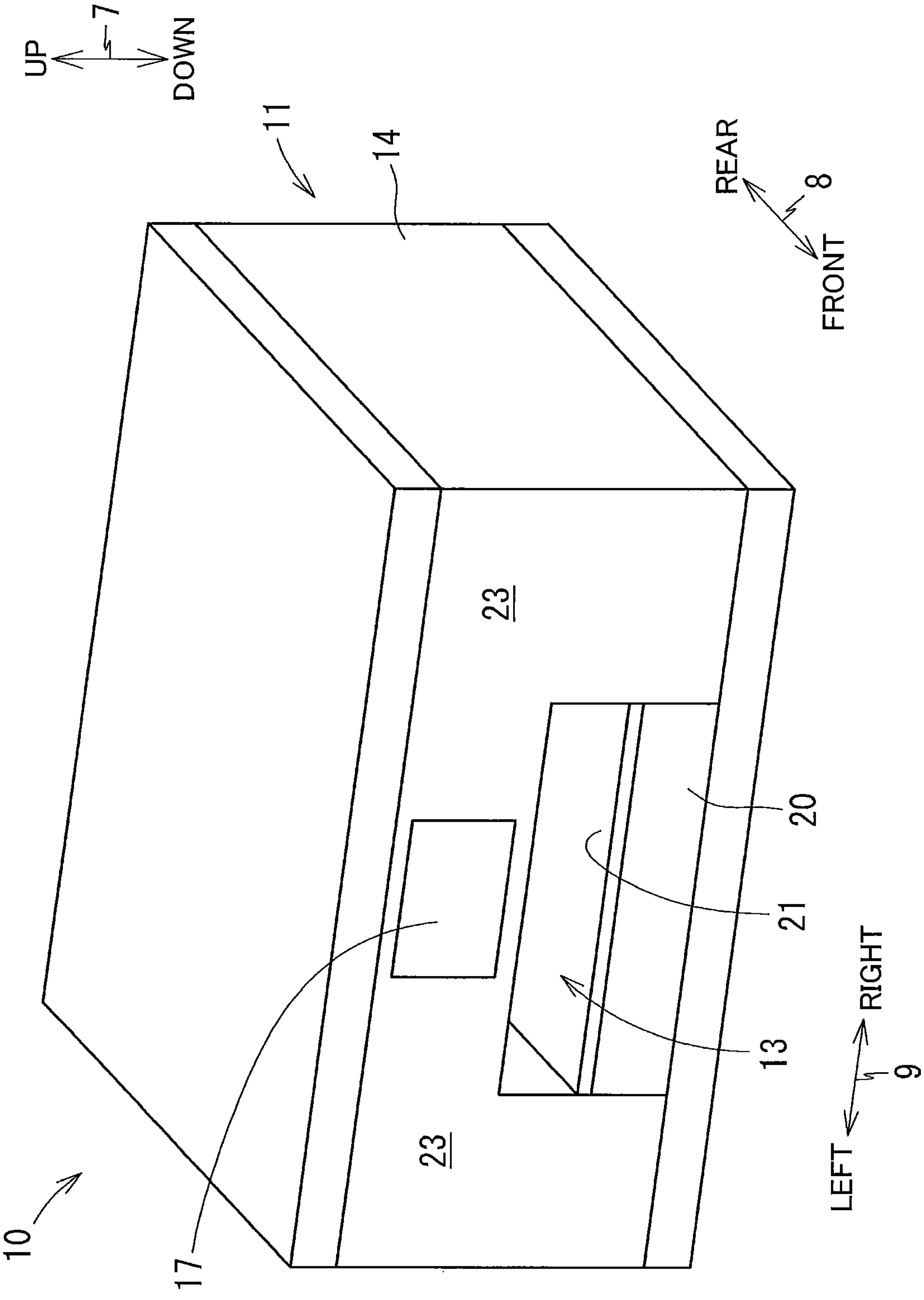
FIG. 1 is a perspective view of a multifunction peripheral 10 according to one embodiment.

Hereinafter, a multifunction peripheral 10 according to one embodiment of the present disclosure will be described with reference to the accompanying drawings. In the following description, the directions indicated by the arrows in the drawings will be referred to the frontward direction, the rearward direction, the upward direction, the downward direction, the leftward direction, and the rightward direction. Further, the bi-direction indicated by two of the arrows that are directed opposite to each other will be referred to as the front-rear direction, the up-down direction, and the left-right direction. The up-down direction 7 is defined based on a state where the multifunction peripheral 10 is installed so as to be usable (the state illustrated in FIG. 1). The front-rear direction 8 is defined such that a front surface 23 formed with an opening 13 (described later) is at the front side of the multifunction peripheral 10. The left-right direction 9 is defined based on the front view of the multifunction peripheral 10. The up-down direction 7, the front-rear direction 8, and the left-right direction 9 are perpendicular to one another.

[Overall Structure of Multifunction Peripheral 10]

As illustrated in FIG. 1, the multifunction peripheral 10 includes a housing 14 having a generally rectangular parallelepiped shape. A printer portion 11 is provided in a lower portion of the housing 14. The multifunction peripheral 10 has various function such as facsimile function and printing function. The multifunction peripheral 10 has, as the printing function, a function of performing image recordation on one side of a sheet 12 (see FIG. 2) with an inkjet recording system. Incidentally, the multifunction peripheral 10 may be of the type configured to perform image recordation on both sides of the sheet 12. The multifunction peripheral 10 is an example of the inkjet recording device. The sheet 12 is an example of the recording medium.

An operating portion 17 is provided at an upper portion of the housing 14. The operating portion 17 includes buttons configured to be operated for instruction of image recordation and various settings, and a liquid crystal display configured to display various information. In this embodiment, the operating portion 17 is configured of a touch panel having both the functions of the buttons and liquid crystal display. The operating portion 17 is an example of the receiving portion.

Figure 2:
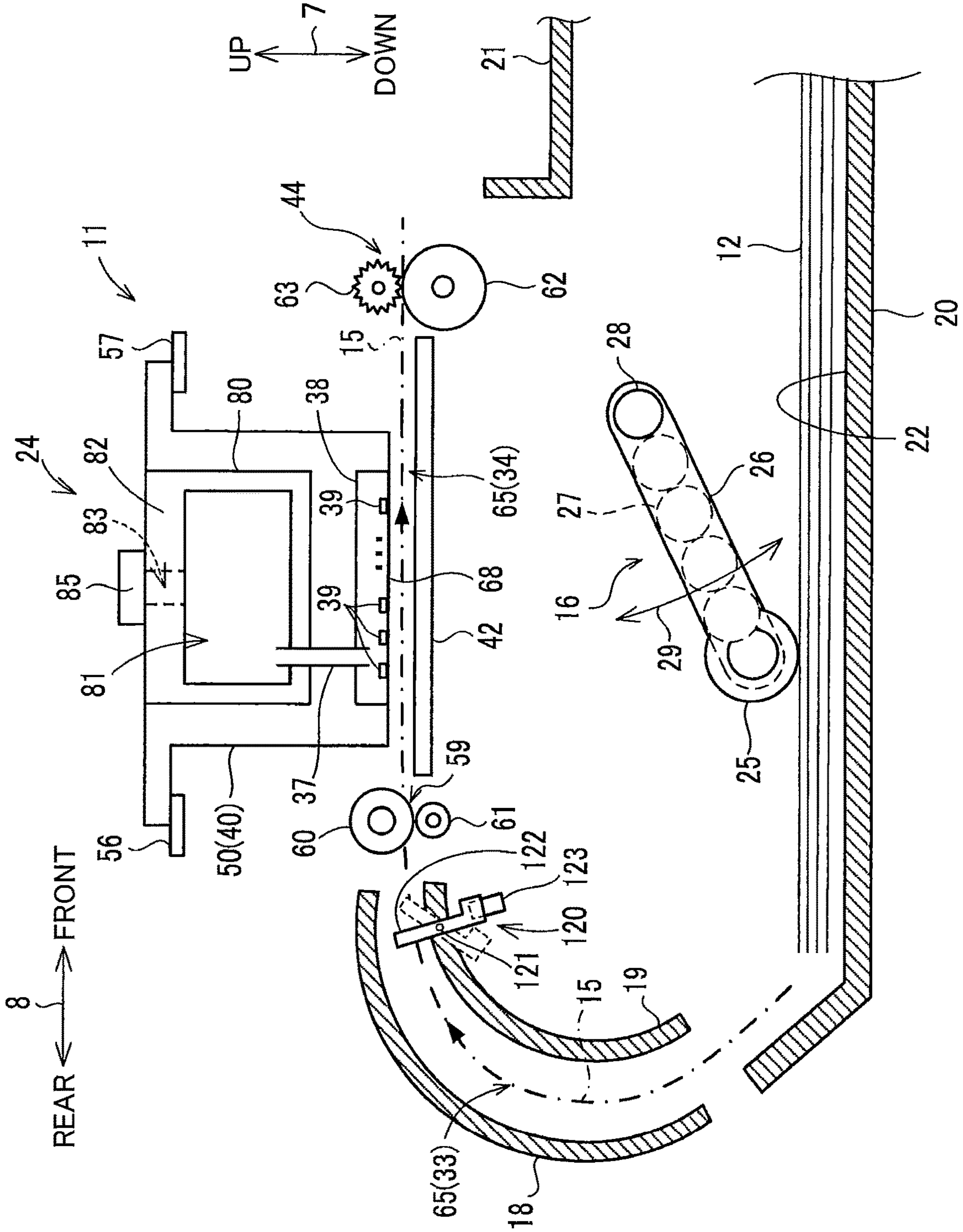
FIG. 2 is a vertical cross-sectional view schematically illustrating the internal structure of a printer portion 11.
Figure 6:
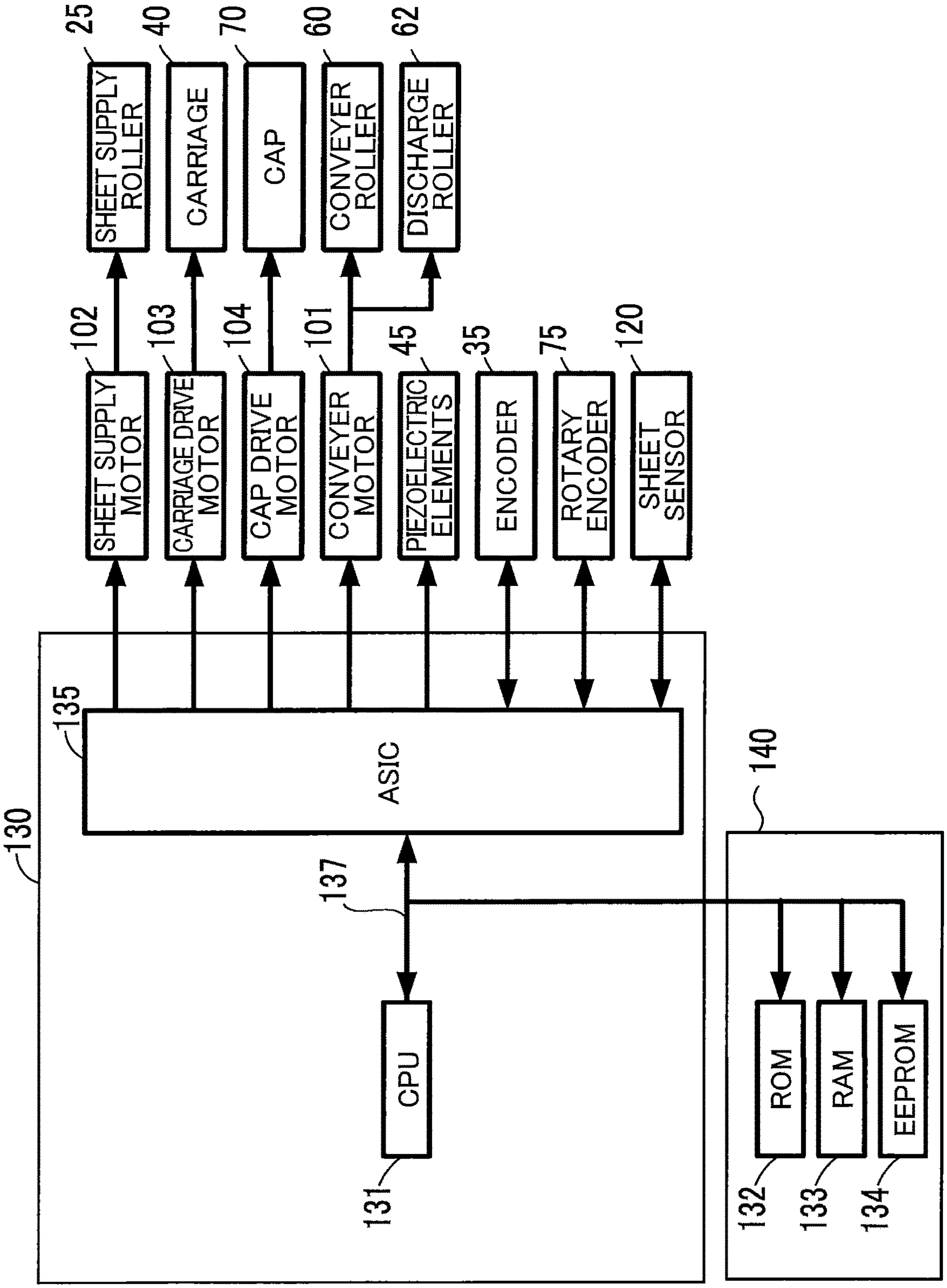
FIG. 6 is a functional block diagram of the multifunction peripheral 10.

As illustrated in FIG. 2, the printer portion 11 includes a sheet tray 20, a sheet feeding unit 16, an outer guide member 18, an inner guide member 19, a pair of conveyer rollers 59, a pair of discharge rollers 44, a platen 42, a recording unit 24, a cap 70 (FIG. 3), an actuation mechanism, a sheet sensor 120, a rotary encoder 75 (FIG. 6), a controller 130 (FIG. 6), and a memory 140 (FIG. 6). These are positioned in an interior of the housing 14.

[Sheet Tray 20]

As illustrated in FIG. 1, the opening 13 is formed at the front surface 23 of the printer portion 11. The sheet tray 20 is movable in the front-rear direction 8 through the opening 13 so that the sheet tray 20 is insertable into and removable from the housing 14.

The sheet tray 20 has a box shape having upper open end, and is configured to accommodate therein the sheets 12. As illustrated in FIG. 2, the sheets 12 are supported in a stacked state on a bottom plate 22 of the sheet tray 20. A discharge tray 21 is positioned above a front portion of the sheet tray 20. The sheet 12 on which an image has been recorded by the recording unit 24 is discharged therefrom and then is supported on an upper surface of the discharge tray 21.

[Sheet Feeding Unit 16]

As illustrated in FIG. 2, the sheet feeding unit 16 is positioned below the recording unit 24 and above the bottom plate 22 of the sheet tray 20. The sheet feeding unit 16 includes a sheet supply roller 25, a sheet feeding arm 26, a power transmission mechanism 27, and a shaft 28. The sheet supply roller 25 is rotatably supported by a tip end portion of the sheet feeding arm 26. The sheet feeding arm 26 has a base end portion at which the shaft 28 is positioned. The sheet feeding arm 26 is pivotally movable about the axis of the shaft 28 along the directions indicated by an arrow 29. Hence, the sheet supply roller 25 is contactable with and separable from the sheet tray 20 or the uppermost sheet 12 of the sheet stack supported on the sheet tray 20.

The power transmission mechanism 27 includes a gear train (a plurality of gears) and is configured to transmit the driving force of a sheet supply motor 102 (see FIG. 6) to the sheet supply roller 25 to rotate the same. When the sheet supply roller 25 is rotated, the sheet 12 that is positioned uppermost in the sheet stack supported on the sheet tray 20 and is in contact with the sheet supply roller 25 is conveyed to a sheet conveying passage 65. Incidentally, the power transmission mechanism 27 may include, instead of the gear train, a belt looped over the shaft 28 and the shaft of the sheet supply roller 25.

[Sheet Conveying Passage 65]

As illustrated in FIG. 2, the sheet conveying passage 65 extends from the rear end portion of the sheet tray 20. The sheet conveying passage 65 includes a curved portion 33 and a linear portion 34. The curved portion 33 is U-shaped extending diagonally upward and rearward and then extending frontward. The linear portion 34 extends approximately in the front-rear direction 8.

The curved portion 33 is defined by the outer guide member 18 and inner guide member 19, which face each other and are spaced away from each other by a predetermined interval. The outer guide member 18 and inner guide member 19 extend in the left-right direction 9. A part of the linear portion 34 is defined by the recording unit 24 and platen 42, which face each other with a predetermined interval therebetween.

The sheet 12 supported by the sheet tray 20 is conveyed along the curved portion 33 by the sheet supply roller 25, and reaches the pair of conveyer rollers 59. Then, the sheet 12 is nipped and conveyed frontward toward the recording unit 24 along the linear portion 34 by the pair of conveyer rollers 59. After the sheet 12 has reached the position immediately below the recording unit 24, the sheet 12 is subjected to image recordation by the recording unit 24. Thereafter, the sheet 12 having an image recorded thereon is conveyed frontward along the linear portion 34 and discharged onto the discharge tray 21. In this way, the sheet 12 is conveyed in a conveying direction 15 indicated by the one-dotted chain line in FIG. 2.

[Pair of Conveyer Rollers 59 and Pair of Discharge Rollers 44]

As illustrated in FIG. 2, the pair of conveyer rollers 59 is positioned at the linear portion 34. The pair of discharge rollers 44 is positioned at the linear portion 34 and downstream of the pair of conveyer rollers 59 in the conveying direction 15. The pair of conveyer rollers 59 is an example of the conveying unit. The pair of discharge rollers 44 is also an example of the conveying unit.

The pair of conveyer rollers 59 includes a conveyer roller 60 and a pinch roller 61 positioned below and facing the conveyer roller 60. The pinch roller 61 is urged toward the conveyer roller 60 by an elastic member such as a coil spring (not illustrated). The pair of conveyer rollers 59 is configured to nip the sheet 12 between the conveyer roller 60 and the pinch roller 61.

The pair of discharge rollers 44 includes a discharge roller 62 and a spur roller 63 positioned above and facing the discharge roller 62. The spur roller 63 is urged toward the discharge roller 62 by an elastic member such as a coil spring (not illustrated). The pair of discharge rollers 44 is configured to nip the sheet 12 between the discharge roller 62 and the spur roller 63.

The conveyer roller 60 and the discharge roller 62 receive the drive force from a conveyer motor 101 (see, FIG. 6) to rotate. When the conveyer roller 60 rotates in a state where the sheet 12 is nipped by the pair of conveyer rollers 59, the sheet 12 is conveyed in the conveying direction 15 onto the platen 42 by the pair of conveyer rollers 59. Further, when the discharge roller 62 rotates in a state where the sheet 12 is nipped by the pair of discharge rollers 44, the sheet 12 is conveyed in the conveying direction 15 and discharged onto the discharge tray 21 by the pair of discharge rollers 44. Incidentally, there may be employed a single common motor serving as both the conveyer motor 101 and the sheet supply motor 102. In this case, power transmission paths from the common motor to each of the conveyer roller 60 and the discharge roller 62 are switchable from each other.

Incidentally, instead of rollers such as the pair of conveyer rollers 59 and the pair of discharge rollers 44, a conveyer belt may be available for conveying the sheet 12.

[Platen 42]

As illustrated in FIG. 2, the platen 42 is positioned at the linear portion 34 of the sheet conveying passage 65. The platen 42 faces the recording unit 24 in the up-down direction 7. The platen 42 is configured to support the sheet 12 conveyed along the sheet conveying passage 65 from below.

Figure 3:
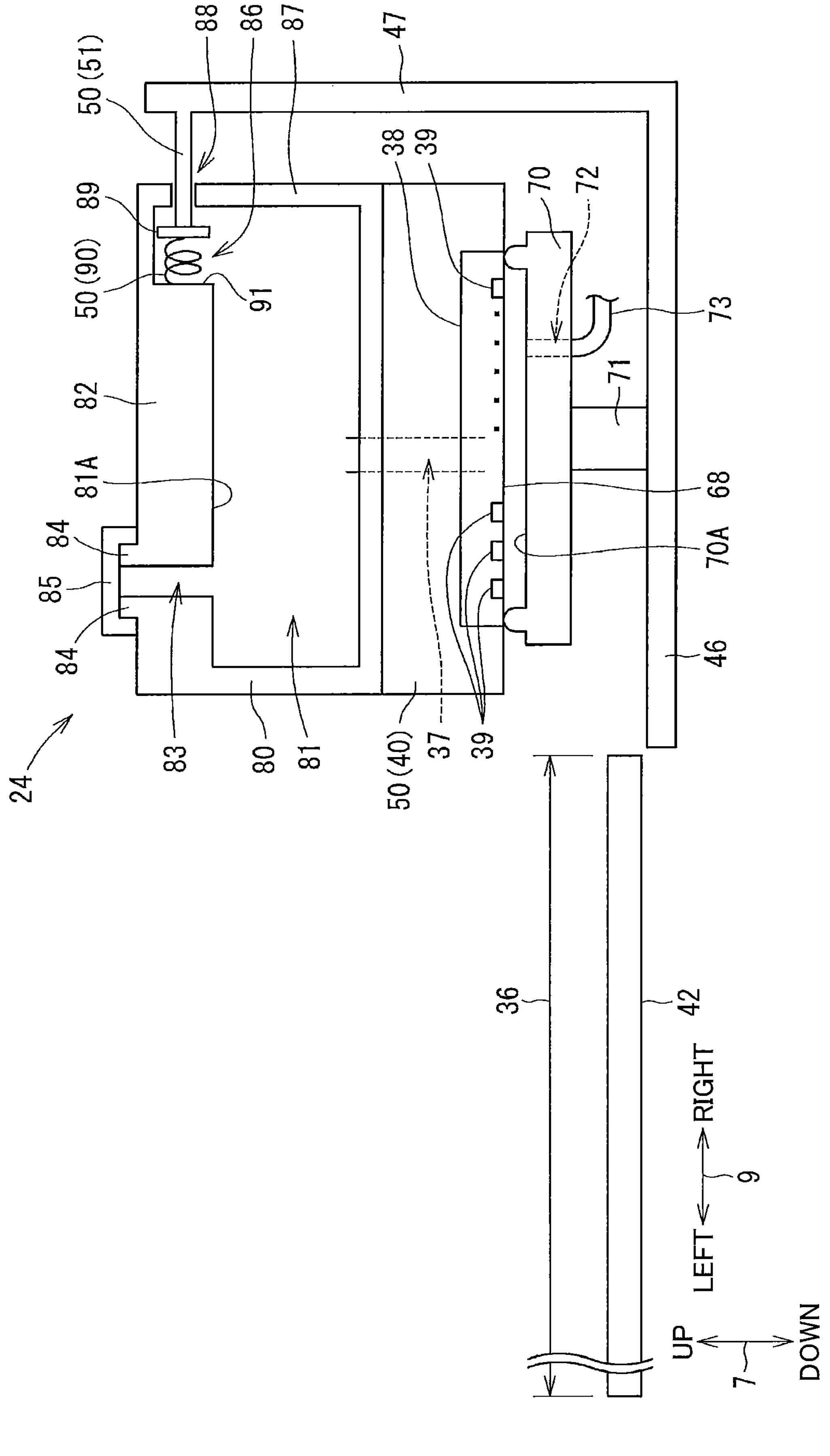
FIG. 3 is a vertical cross-sectional view of a platen 42 and a recording unit 24 taken along a plane perpendicular to a front-rear direction 8, and particularly illustrates a state where a carriage 40 is at a maintenance position and a cap 70 is at a capping position.
Figure 4:
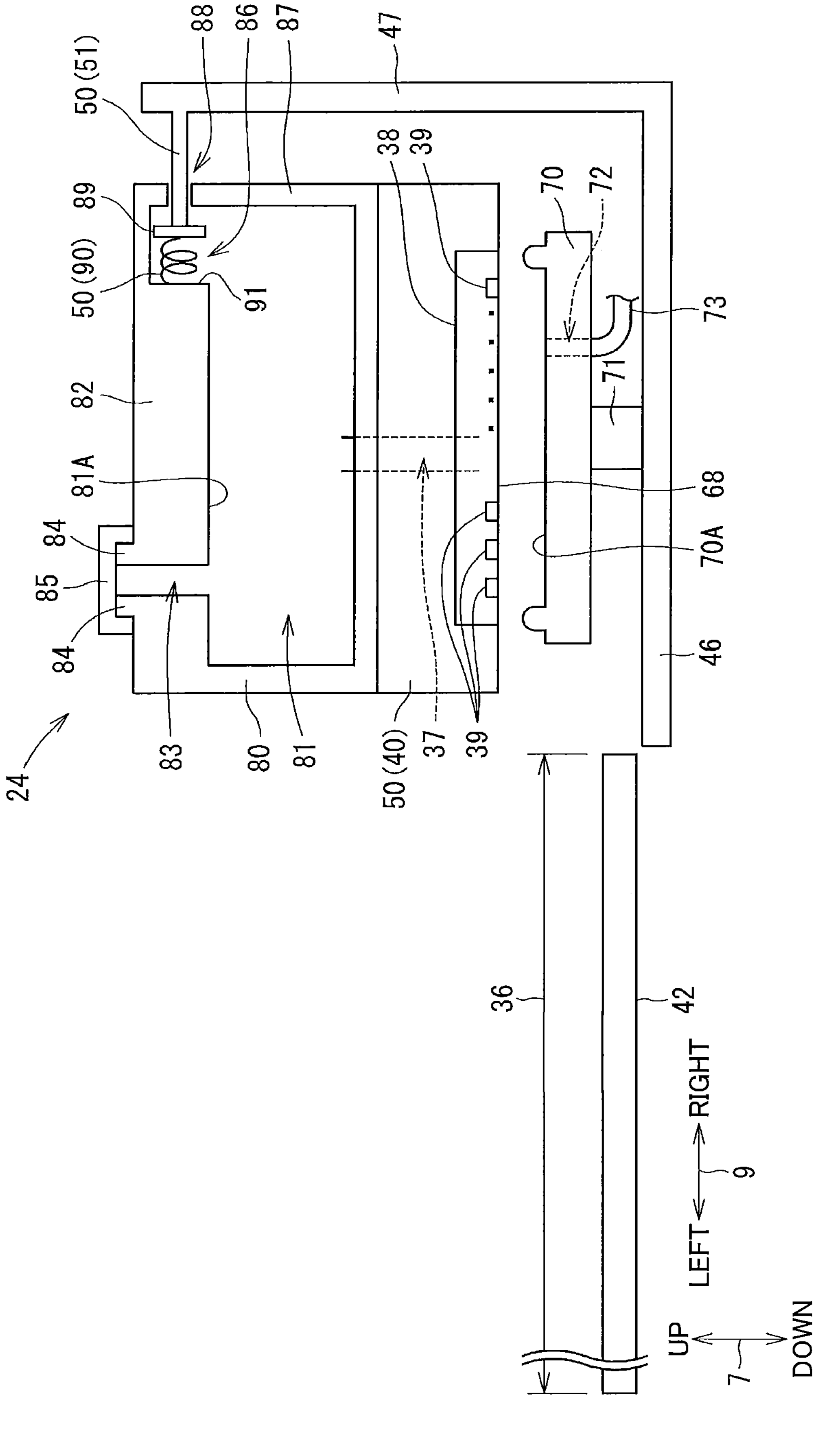
FIG. 4 is a vertical cross-sectional view of the platen 42 and the recording unit 24 taken along the plane perpendicular to the front-rear direction 8, and particularly illustrates a state where the carriage 40 is at the maintenance position and the cap 70 is at a separation position.
Figure 5:
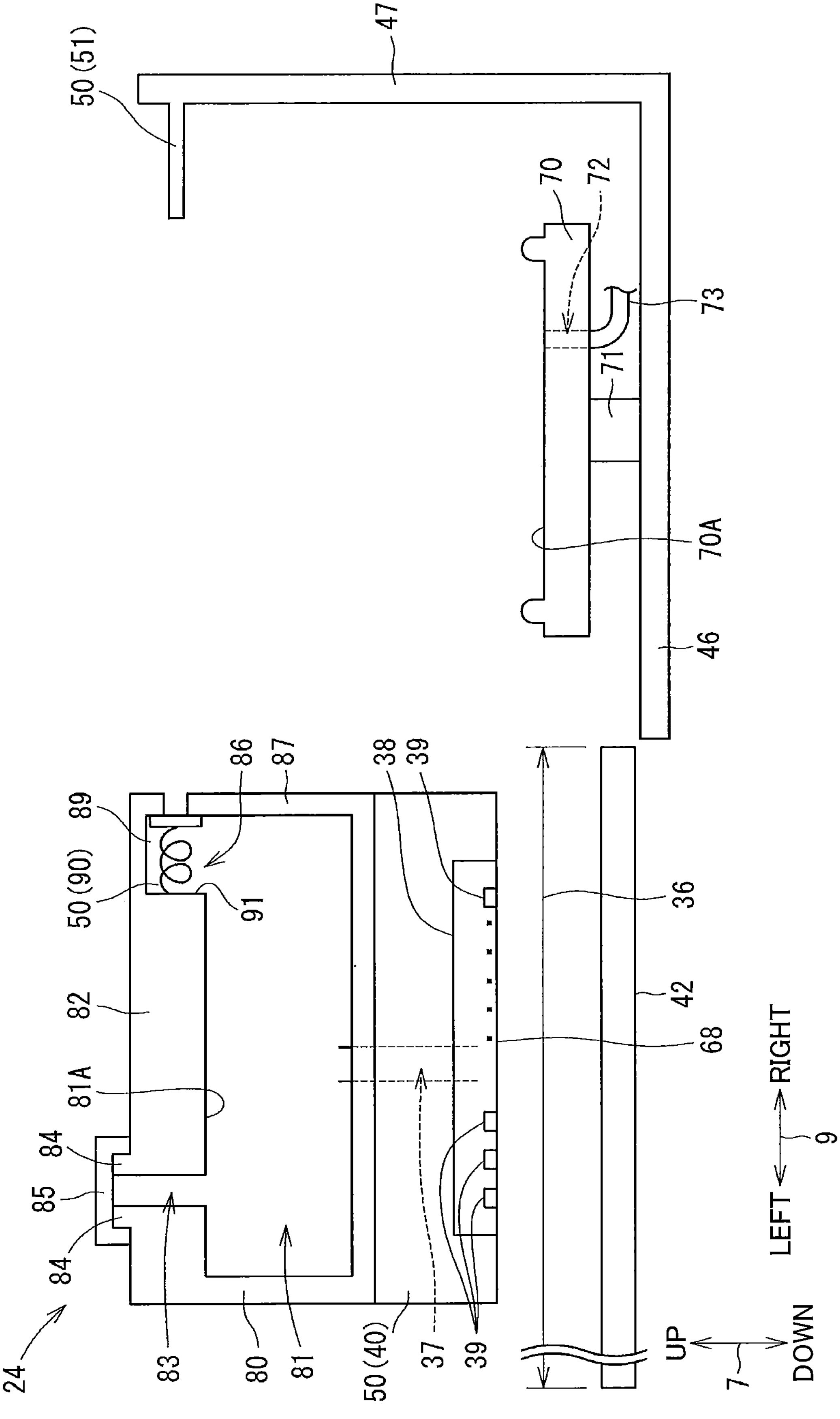
FIG. 5 is a vertical cross-sectional view of the platen 42 and the recording unit 24 taken along the plane perpendicular to the front-rear direction 8, and particularly illustrates a state where the carriage 40 is positioned above a medium passing region 36 and the cap 70 is at the separation position.

As illustrated in FIGS. 3 through 5, a medium passing region 36 is provided between the right edge and left edge of the platen 42 in the left-right direction 9. The sheet 12 conveyed along the sheet conveying passage 65 passes through the medium passing region 36.

[Recording Unit 24]

As illustrated in FIG. 2, the recording unit 24 is positioned above the platen 42 and faces the same. The recording unit 24 includes a carriage 40, a head 38, and a storage portion 80. The carriage 40 is an example of the support member.

The carriage 40 is supported by guide rails 56 and 57 so as to be movable in the left-right direction 9 perpendicular to the conveying direction 15. The left-right direction 9 is an example of the scanning direction. The guide rails 56 and 57 are positioned spaced away from each other in the front-rear direction 8 and extend in the left-right direction 9. The carriage 40 is movable between a position rightward of the medium passing region 36 and a position leftward of the medium passing region 36. Incidentally, the moving direction of the carriage 40 is not limited to the left-right direction 9, but may be a direction crossing the conveying direction 15.

The guide rail 56 is positioned upstream of the head 38 in the conveying direction 15, and the guide rail 57 is positioned downstream of the head 38 in the conveying direction 15. The guide rails 56 and 57 are supported by a pair of side frames (not illustrated) positioned outward of the linear portion 34 of the sheet conveying passage 65 in the left-right direction 9. The carriage 40 receives the drive force from a carriage drive motor 103 (see FIG. 6) to move.

The encoder 35 (see FIG. 6) includes an encoder strip and an optical sensor. The encoder strip is positioned at one of the guide rails 56 and 57. The encoder strip extends in the left-right direction 9, and has a pattern of light transmission portions and light blocking portions alternately arrayed in the left-right direction 9 with equal intervals. The optical sensor is provided at the carriage 40 at a position facing the encoder strip. The optical sensor is configured to detect the light transmission portions and the light blocking portions to generate a pulse signal. The generated pulse signal is a signal identifying the position of the carriage 40 in the left-right direction 9. The generated pulse signal is outputted to the controller 130 (FIG. 6).

The head 38 is supported by the carriage 40. The head 38 has a lower surface 68 exposed downward and facing the platen 42. The head 38 includes a plurality of nozzles 39, an ink passage 37, and piezoelectric elements 45 (see FIG. 6).

The plurality of nozzles 39 are open at the lower surface 68 of the head 38. The head 38 connects the storage portion 80 to the plurality of nozzles 39. Each piezoelectric element 45 is configured to deform a part of the ink passage 37 to eject ink droplet downward from the corresponding nozzle 39. The piezoelectric element 45 is driven upon electric supply controlled by the controller 130.

The storage portion 80 is attached to and supported by the carriage 40. The storage portion 80 has an internal space 81 in which ink is storable. In the present embodiment, the recording unit 24 includes a single storage portion 80 in which black ink is stored. Color of ink stored in the storage portion 80 is not limiting.

The storage portion 80 is positioned above the head 38. Incidentally, in the present embodiment, the entire storage portion 80 is positioned above the head 38. However, as an alternative, a part of the storage portion 80 may be positioned above the head 38 and the remaining part of the storage portion 80 may be positioned lower than the head 38 or even with the head 38.

The internal space 81 of the storage portion 80 is in communication with the plurality of nozzles 39 through the ink passage 37. Hence, ink can be supplied from the internal space 81 to the nozzles 39.

The storage portion 80 has an upper wall 82 formed with an ink inlet 83 for injection of ink into the internal space 81. The ink inlet 83 penetrates the upper wall 82 in the thickness direction to allow the internal space 81 to be communicated with an outside of the storage portion 80.

A protruding wall 84 surrounding the ink inlet 83 protrudes upward from an upper surface of the upper wall 82. The ink inlet 83 is closed by fitting a lid 85 with the protruding wall 84. The ink inlet 83 is exposed to the outside by detaching the lid 85 from the protruding wall 84. In this state, an ink bottle (not illustrated) can be inserted into the ink inlet 83 and ink can be injected from the ink bottle into the internal space 81 through the ink inlet 83 for replenishing the storage portion 80 with ink. Incidentally, the position of the ink inlet 83 is not limiting as long as the ink inlet 83 is at a position enabling the ink inlet 83 to communicate the upper portion of the internal space 81 with the outside.

As illustrated in FIGS. 3 through 5, a valve accommodation space 86 is formed in the internal space 81. In the present embodiment, the valve accommodation space 86 is defined by a recessed portion formed at a right portion of the upper wall 82. The recessed portion has a side surface 91 defining a part of the valve accommodation space 86. The storage portion 80 has a side wall 87 formed with an air communication opening 88. The side wall 87 and the side surface 91 face each other. The air communication opening 88 permits the valve accommodation space 86 to communicate with an outside of the storage portion 80.

A valve 89 and a coil spring 90 are disposed in the valve accommodation space 86. The valve 89 is movable between a closing position (see FIG. 5) in which the valve 89 is seated on the air communication opening 88 to close the air communication opening 88 and an opening position (see FIGS. 3 and 4) in which the valve 89 is separated from the air communication opening 88 to open the air communication opening 88. The coil spring 90 has one end connected to the valve 89 and the other end connected to the side surface 91. The coil spring 90 urges the valve 89 toward the closing position. The coil spring 90 is an example of the urging member.

[Cap 70]

As illustrated in FIGS. 3 through 5, the cap 70 is positioned outward of the platen 42 in the left-right direction 9 (rightward of the platen 42 in the present embodiment). That is, the cap 70 is positioned outward of the medium passing region 36 in the left-right direction 9. In a state where the carriage 40 is at a maintenance position (i.e., the position illustrated in FIGS. 3 and 4) rightward of the medium passing region 36, the cap 70 is positioned below the carriage 40 and faces the same (more specifically, the cap 70 faces the nozzles 39 of the head 38).

The cap 70 has a box-like shape having upper open end. The cap 70 is made of an elastic member such as rubber. The cap 70 is supported by a frame 46 through a known movable mechanism 71, and is movable in the up-down direction by the movable mechanism 71 applied with a driving force from a cap drive motor 104 (see FIG. 6). The frame 46 is positioned rightward of the platen 42, and is a plate-shaped member extending both in the front-rear direction 8 and the left-right direction 9. The movable mechanism 71 includes, for example, a ball screw or a cam.

The cap 70 is movable upward and downward between a capping position illustrated in FIG. 3 and a separation position illustrated in FIG. 4. In a state where the cap 70 is at the capping position as illustrated in FIG. 3, the upper end of the cap 70 is in pressure contact with the lower surface 68 of the head 38 from below. Hence, in this state, the plurality of nozzles 39 which open at the lower surface 68 is covered by the cap 70 from below. The separation position is positioned below the capping position. The cap 70 at its separation position is separated from the lower surface 68 of the head 38.

The cap 70 has a bottom wall formed with a through-hole 72. The through-hole 72 has one end opening at a bottom surface 70A of the cap 70, and the other end connected to one end of a tube 73. The other end of the tube 73 is connected to a waste ink tank (not illustrated) through a pump (not illustrated). The tube 73 is made of resin and has a flexibility.

In a state where the cap 70 is at the capping position and covers the nozzles 39, ink and foreign substance in the nozzles 39 are sucked by the actuation of the pump and is ejected to the cap 70. The ejected ink and foreign substance are received by the cap 70 and then sucked into the tube 73, and are discharged to the waste ink tank through the tube 73.

[Actuation Mechanism 50]

The actuation mechanism 50 illustrated in FIGS. 3 through 5 is configured to move the valve 89 between the opening position and the closed position. As illustrated in FIGS. 3 through 5, the actuation mechanism 50 includes an abutment member 51, the coil spring 90, and the carriage 40. The actuation mechanism 50 is an example of the actuator.

The abutment member 51 is positioned outward of the platen 42 in the left-right direction 9 (in the present embodiment, the abutment member 51 is positioned rightward of the platen 42). That is, the abutment member 51 is positioned outward of the medium passing region 36 in the left-right direction 9. The abutment member 51 protrudes leftward from a frame 47. The frame 47 is a plate-like member protruding from the frame 46 and extending in both the up-down direction 7 and the front-rear direction 8.

The position in the up-down direction 7 and the position in the front-rear direction 8 of the abutment member 51 are the same as those of the air communication opening 88. The diameter of the abutment member 51 is smaller than that of the air communication opening 88. In accordance with movement of the carriage 40 from a position above the platen 42 (the position above the medium passing region 36) to the maintenance position rightward of the platen 42, the abutment member 51 is inserted from the right into the valve accommodation space 86 through the air communication opening 88 and pushes the valve 89 leftward from the right. Hence, the valve 89 is moved from the closing position to the opening position against the urging force of the coil spring 90. That is, the air communication opening 88 is opened. On the other hand, in accordance with leftward movement of the carriage 40 from the maintenance position, the valve 89 is separated from the abutment member 51, so that the valve 89 is moved from the opening position to the closing position by the urging force of the coil spring 90.

That is, in the actuation mechanism 50, when the carriage 40 is moved, the abutment member 51 and coil spring 90 act on the valve 89 to move the valve 89.

Incidentally, in the present embodiment, the valve 89 is at the opening position in a state where the carriage 40 is at the maintenance position. That is, the valve 89 is at the opening position in a state where the nozzles 39 of the head 38 face the cap 70 in the up-down direction 7.

[Sheet Sensor 120]

As illustrated in FIG. 2, the sheet sensor 120 is positioned at the sheet conveying passage 65 and upstream of the pair of conveyer rollers 59 in the conveying direction 15. The sheet sensor 120 is configured to detect whether the sheet 12 is present at the disposed position of the sheet sensor 120 (i.e., at the position at which the sheet sensor 120 is disposed). Incidentally, known sheet sensors are available as the sheet sensor 120. In the present embodiment, the sheet sensor 120 includes, for example, a shaft 121, a detection probe 122 pivotally movable about the axis of the shaft 121, and an optical sensor 123 including a light emitting element and a light receiving element configured to receive light emitted from the light emitting element.

The detection probe 122 has one end portion protruding to the sheet conveying passage 65. The other end portion of the detection probe 122 is configured to advance into and retract from an optical path extending from the light emitting element to the light receiving element.

In a state where no external force is applied to the one end portion of the detection probe 122, the other end portion of the detection probe 120 is positioned in the optical path and blocks light emitted from the light emitting element, as indicated by the solid line in FIG. 2. At this time, a low-level signal is outputted from the optical sensor 123 to the controller 130.

When the one end portion of the detection probe 122 is pushed by the leading end of the sheet 12 during conveyance thereof, the detection probe 122 pivotally moves and the other end portion of the detection probe 122 retracts from the optical path (as indicated by the broken line in FIG. 2), thereby allowing the light to reach the light receiving element. At this time, a high-level signal is outputted from the optical sensor 123 to the controller 130. Incidentally, the detection probe 122 is urged to the position indicated by the solid line by a spring and the like.

[Rotary Encoder 75]

The rotary encoder 75 (FIG. 6) includes an encoder disc provided at the shaft of the conveyer motor 101 (FIG. 6) and rotatable together with the shaft, and an optical sensor. The encoder disc is formed with a pattern of light transmission portions and light blocking portions alternately arrayed in a circumferential direction of the encoder disc with equal intervals. When the encoder disc rotates, the optical sensor detects the light transmission portions and light blocking portions to generate a pulse signal. The generated pulse signal is outputted to the controller 130 from the optical sensor of the rotary encoder 75. The controller 130 calculates rotation amount of the conveyer motor 101 on the basis of the outputted pulse signal. Incidentally, in addition to the rotary encoder 75 for the conveyer motor 101, other rotary encoders may be provided for the sheet supply motor 102 and the conveyer roller 60, for example.

[Controller 130 and Memory 140]

Details of the controller 130 and the memory 140 will next be described with reference to FIG. 6. Particular features in the present disclosure are attained by the controller 130 performing processes in accordance with flowcharts described later. The controller 130 is configured to control overall operation of the multifunction peripheral 10.

The controller 130 includes CPU 131 and ASIC 135. The memory 140 includes a ROM 132, a RAM 133, and an EEPROM 134. The CPU 131, the ASIC 135, the ROM 132, the RAM 133 and the EEPROM 134 are connected to each other via an internal bus 137.

The ROM 132 stores therein programs which the CPU 131 executes to control various operations. The RAM 133 is used as a memory region to temporarily store data and signals used when the CPU 131 is executing the programs, or a working region for data processing. The EEPROM 134 stores settings and flags, etc. to be held after power off.

The ASIC 135 is connected to the conveyer motor 101, the sheet supply motor 102, the carriage drive motor 103, and the cap drive motor 104. Driver circuits for controlling the corresponding motors are incorporated in the ASIC 135. The CPU 131 is configured to output drive signals for rotating the motors to the corresponding driver circuit. Each driver circuit is configured to output driving current based on the drive signal acquired from the CPU 131 to the corresponding motor to thereby rotate the same.

That is, the controller 130 controls the sheet supply motor 102 to control the sheet feeding unit 16 to feed the sheet 12. The controller 130 controls the conveyer motor 101 to control the pair of conveyer rollers 59 and the pair of discharge rollers 44 to convey the sheet 12. The controller 130 controls the carriage drive motor 103 to move the carriage 40. Further, the controller 130 controls the cap drive motor 104 to drive the movable mechanism 71 to move the cap 70.

Further, the ASIC 135 is connected to the sheet sensor 120. On the basis of an electric signal (a detection signal) received from the sheet sensor 120, the controller 130 determines whether the sheet 12 is present at the disposed position in which the sheet sensor 120 is disposed.

Further, the ASIC 135 is connected to the optical sensor of the rotary encoder 75. The controller 130 calculates rotation amount of the conveyer motor 101 on the basis of the pulse signal (an electric signal) received from the optical sensor of the rotary encoder 75.

The controller 130 calculates (identifies) the position of the sheet 12 on the basis of the rotation amount of the conveyer motor 101 counted from a timing at which the pulse signal received from the sheet sensor 120 is changed from the low-level signal to the high-level signal (i.e., from a timing of detecting arrival of the leading end of the sheet 12 at the disposed position of the sheet sensor 120).

Further, the ASIC 135 is connected to the encoder 35. On the basis of the pulse signal (an electric signal) received from the encoder 35, the controller 130 identifies the position of the carriage 40 and determines whether or not the carriage 40 is moving.

Further, the ASIC 135 is connected to the piezoelectric elements 45. The piezoelectric elements 45 are driven by being supplied with electric power through a driver circuit (not illustrated) under control by the controller 130. The controller 130 controls supply of electric power to the piezoelectric elements 45 to cause the nozzles 39 to eject ink droplets. More specifically, the controller 130 supplies electric power to one or more of the piezoelectric elements 45 corresponding to selected one or more of the plurality of nozzles 39 to thereby cause the selected one or more nozzles to eject ink droplets.

The controller 130 alternately performs a conveying process and a printing process for recording an image on the sheet 12. The conveying process is a process in which the pair of conveyer rollers 59 and the pair of discharge rollers 44 are controlled to convey the sheet 12 by a predetermined amount of line feed. The controller 130 controls, by controlling the conveyer motor 101, the pair of conveyer rollers 59 and the pair of discharge rollers 44 to perform the conveying process.

The printing process is a process in which the controller 130 controls, while moving the carriage 40 in the left-right direction 9, supply of electric power to the piezoelectric elements 45 to cause the head 38 to eject ink droplets from the nozzles 39. During the printing process, the carriage 40 is positioned within the medium passing region 36 and faces the platen 42, as illustrated in FIG. 5.

The controller 130 temporarily stops conveyance of the sheet 12 for a predetermined time period between a preceding conveying process and a subsequent conveying process. The printing process is performed during the time period for stopping the sheet 12. That is, in the printing process, the controller 130 performs a single pass operation in which ink droplets are ejected from the nozzles 39 while moving the carriage 40 rightward or leftward. Hence, image recordation for one pass operation is performed on the sheet 12.

The controller 130 repeatedly and alternately performs the conveying process and the printing process, so that image recordation is performed on the entire image recordable region of the sheet 12. That is, the controller 130 performs the pass operation a plurality of times to record an image on the sheet 12.

Incidentally, the controller 130 is not limited to the above-described configuration. For example, the controller 130 may have a configuration in which only the CPU 131 performs various processes, a configuration in which only the ASIC 135 performs the various processes, or a configuration in which the CPU 131 and the ASIC 135 perform the various processes in cooperation with each other. Further, the controller 130 may have a configuration in which a single CPU 131 solely performs processes, or a configuration in which a plurality of CPUs 131 shares the processes. Alternatively, the controller 130 may have a configuration in which a single ASIC 135 solely performs processes, or a configuration in which a plurality of ASICs 135 shares the processes.

The memory 140 is configured to store therein an ink count value, an initial value, a value of the volume (hereinafter, referred to as "volume value") of the internal space 81, an ink threshold value, and a value of a prescribed time period (hereinafter, referred to as "prescribed time period value").

The ink count value is a value which is updated in accordance with the amount of ink ejected from the head 38. The ink count value is stored in the RAM 133 or the EEPROM 134. The ink count value is calculated on the basis of print data. The print date is data for an image to be recorded on the sheet 12.

Specifically, the controller 130 references print data transmitted from an external device (such as a PC) connected to the multifunction peripheral 10 through a LAN and the like. The print data is sequentially transmitted from the external device. When receiving the print data, the controller 130 estimates, on the basis of the received print data, the amount of ink to be ejected in the next printing process to determine an ink count value corresponding to the estimated amount of ink. That is, the controller 130 determines, for each of the dots present in a region subject to image recordation by the next printing process, the number of times of ejections of ink droplets on the basis of the print data. Further, the controller 130 sums up all of the calculated numbers of times of ejections for all of the dots present in the region to calculate the total number of times of ejections required for the image recordation of the recording subject region in the next printing process. The calculated total number of times of ejections is used as the ink count value corresponding to the amount of ink required for the next printing process.

As described later, the ink count value is updated by accumulation on the basis of the print data. Further, the controller 130 resets the ink count value to the initial value at a predetermined timing.

The initial value is an initial value for the ink count value, and a preset value is stored as the initial value in the ROM 132 or the EEPROM 134. In the present embodiment, the initial value is zero.

Incidentally, in the present embodiment, the ink count value is counted up from the initial value of zero. However, the ink count value may be counted down from an initial value that is not zero.

The volume value of the internal space 81 is a designed value determined by a structure of the storage portion 80, and is stored in the ROM 132 or the EEPROM 134. The volume value of the internal space 81 may be its volume itself. Alternatively, the volume value may be the volume of a portion of the internal space 81 in which the maximum storable amount of ink for the storage portion 80 is stored, i.e., the volume corresponding to the maximum storable amount of ink for the storage portion 80.

The ink threshold value is compared with a consumption amount of ink stored in the internal space 81. The ink threshold value is used for determining a timing of opening the valve 89. Specifically, the ink threshold value is preset such that the ink count value exceeds the ink threshold value before ink meniscuses formed at ejecting openings of the nozzles 39 are broken due to elevation in the level of negative pressure in the internal space 81 of the storage portion 80. The ink threshold value is set taking the withstanding pressure of the ink meniscus into account. For example, the ink threshold value is determined by parameters such as a height of ink from ink level in the nozzle 39 to ink level in the internal space 81, and a diameter of the nozzle 39. In the present embodiment, the ink threshold value is a variable value, and is stored in the RAM 133 or the EEPROM 134.

The controller 130 calculates the residual amount of ink stored in the internal space 81 on the basis of the volume value of the internal space 81 and the ink count value, for example, by subtracting the ink consumption amount corresponding to the ink count value from the volume value of the internal space 81. The smaller the calculated ink residual amount is, the larger the controller 130 sets the ink threshold value. For example, a data table in which a plurality of ranges of the ink residual amount (for example, three ranges of a small ink residual amount, an intermediate ink residual amount, and a large residual amount) and a plurality of values used as the ink threshold value are associated with in one-to-one correspondence with each other is stored in the ROM 132 and the like in advance, and the controller 130 references the data table to determine the ink threshold value (i.e., to set the ink threshold value to the proper one of the plurality of values). Incidentally, the number of the ranges described above is not limited to three and may be two or not less than four.

The ink threshold value may be a fixed value. In this case, the ink threshold value is stored in the ROM 132 or the EEPROM 134. Further, in this case, the ink threshold value is determined by a ratio of the volume of an ink storable space of the internal space 81 to the volume of the remaining space of the internal space 81. The ink storable space of the internal space 81 is a space occupied by ink when the maximum storable amount of ink for the storage portion 80 is stored in the internal space 81. Incidentally, the remaining space of the internal space 81 described above is occupied by gas such as air in a state where the maximum storable amount of ink for the storage portion 80 is stored in the internal space 81.

The predetermined time period value is a predetermined value and stored in the ROM 132 or the EEPROM 134. For example, the predetermined time period value is set as follows. A period of time required for the amount of consumed ink to reach a specific consumption amount is estimated on the basis of a past experience, and the predetermined time period value is set to a period of time shorter than or equal to the estimated period of time. Here, the specific consumption amount is a consumption amount required for the level of the negative pressure in the internal space 81 to rise to a negative pressure level that is likely to cause breakage of the meniscuses formed in the ejecting openings of the nozzles 39.

[Control of Image Recordation by Controller 130]

In the printer portion 11 constructed as described above, the controller 130 performs sequential image recordation control in which the sheet 12 is conveyed and image is recorded on the conveyed sheet 12. The process for the image recordation control will next be described with reference to the flowcharts illustrated in FIG. 7.

In a case where the image recordation control is not performed, the recording unit 24 and the cap 70 are at the positions illustrated in FIG. 3. Specifically, the carriage 40 is at the maintenance position, and the cap 70 is at the capping position. Accordingly, the valve 89 is at the opening position. Further, in the present embodiment, the ink count value at the time of starting the image recordation control is the initial value, i.e., zero.

Print command is transmitted to the controller 130 from the operating portion 17 (see, FIG. 1) of the multifunction peripheral 10 or from an external device connected to the multifunction peripheral 10. The print command contains a command to start image recordation control, information on the size of the sheet 12, and print data for an image to be recorded on the sheet 12.

When acquiring print command (S10: Yes), the controller 130 starts feeding the sheet 12 (S20) supported on the sheet tray 20.

In step S20, the controller 130 starts driving the sheet supply motor 102, whereby the sheet supply roller 25 feeds the sheet 12 supported on the sheet tray 20 to the sheet conveying passage 65. Further, the controller 130 drives the conveyer motor 101, whereby the pair of conveyer rollers 59 conveys the sheet 12 in the conveying direction 15 when the leading end (the downstream end in the conveying direction 15) of the sheet 12 fed to the sheet conveying passage 65 by the sheet supply roller 25 arrives at the pair of conveyer rollers 59.

Nest, the controller 130 performs a cueing process. In the cueing process, the controller 130 stops the sheet 12, which is being conveyed in the conveying direction 15, at an image recording start position. The image recording start position is a position in which the leading end (downstream end) of the image recording region of the sheet 12 in the conveying direction 15 faces the nozzle 39 of the plurality of nozzles 39 which is positioned at most downstream end in the conveying direction 15.

Further, in step S20, the controller 130 drives the cap drive motor 104, whereby the movable mechanism 71 is actuated to move the cap 70 from the capping position to the separation position. That is, the cap 70 is moved away from the head 38. Next, the controller 130 drives the carriage drive motor 103 to move the carriage 40 from the maintenance position to a start position. The start position is a position from which the carriage 40 starts to move at the time of execution of the printing process (S70). The start position is determined on the basis of the print data.

When the carriage 40 is moved leftward toward the start position from the maintenance position, the valve 89 is separated from the abutment member 51. Hence, the valve 89 is moved from the opening position to the closing position by the urging force of the coil spring 90. This movement of the valve 89 to the closing position causes the internal space 81 of the storage portion 80 to enter the shut off state against the atmosphere, that is, the sealed state. Incidentally, the controller 130 starts counting a time period elapsing from the timing at which the valve 89 starts to be moved from the opening position toward the closing position, that is, from the timing at which the carriage 40 starts to be moved leftward from the maintenance position. This time period counted by the controller 130 will be also referred to as “elapsed time”.

Further, in step S20, the controller 130 references the print data to determine the ink count value corresponding to the amount of ink to be ejected in the next pass operation, that is, in the next printing process (S70). The controller 130 adds the determined ink count value to the ink count value presently stored in the memory 140, and stores the addition result in the memory 140 as a new ink count value. Hence, the ink count value is updated.

In the step S20, the operation from the feeding of the sheet 12 to the cueing process, the operation of moving the cap 70 and the carriage 40, and the update of the ink count value are performed in parallel.

Next, the controller 130 compares the ink count value with the ink threshold value (S30).

In a case where the ink count value is not less than the ink threshold value in S30 (S30: Yes), the controller 130 moves the carriage 40 to the maintenance position (S40), and thereafter, moves the carriage 40 from the maintenance position to the start position (S50). The valve 89 is moved to the opening position by the movement of the carriage 40 to the maintenance position, and then the valve 89 is moved to the closing position by the movement of the carriage 40 to the start position from the maintenance position. That is, in the steps S40 and S50, the internal space 81 of the storage portion 80 is temporarily communicated with the atmosphere, and then again shut off from the atmosphere. After the step S50, the controller 130 performs the printing process (S70).

Incidentally, when the movement of the valve 89 from the closing position to the opening position is completed in the process from S40 to S50, that is, when the movement of the carriage 40 to the maintenance position is completed in the process from S40 to S50, the controller 130 resets the elapsed time that has been counted. Further, in S50, when the valve 89 starts to be moved from the opening position to the closing position, that is, when the carriage 40 starts to be moved leftward from the maintenance position, the controller 130 resets the ink count value to the initial value (zero) and again starts counting an elapsed time from the timing at which the carriage 40 starts to be moved leftward from the maintenance position in S50. The elapsed time is an example of the specific time period. The timing from which the elapsed time starts to be counted, i.e., the timing at which the carriage 40 starts to be moved leftward from the maintenance position in S50 is an example of the specific timing.

In the step S30, in a case where the ink count value is less than the ink threshold value (S30; No), the controller 130 compares the predetermined time period with the elapsed time from the timing at which the valve 89 starts moving to the closing position from the opening position (S60).

In a case where the elapsed time is longer than the predetermined time period (S60: Yes), the controller 130 moves the carriage 40 to the maintenance position once to cause the internal space 81 to be communicated with the atmosphere (S40), and thereafter, moves the carriage 40 from the maintenance position to the start position again (S50). Then, the controller 130 performs the printing process (S60). On the other hand, in a case where the elapsed time is not longer than the predetermined time period (S60: No), the controller 130 performs the printing process (S70).

In the printing process (S70), the controller 130 performs a single pass operation. That is, the controller 130 controls the head 38 to eject ink droplets from the nozzles 39 while moving the carriage 40 from the start position. Incidentally, the carriage 40 that has started moving from the maintenance position in the step S20 or S50 may continue moving for the printing process without stopping at the start position. Of course, the carriage 40 may be temporarily stopped at the start position. During the printing process, the valve 89 is at the closing position since the carriage 40 is not at the maintenance position. That is, the controller 130 controls the carriage 40 to maintain the valve 89 at the closing position while the head 38 is ejecting ink from the nozzles 39 toward the sheet 12.

After the printing process (S70), the controller determines whether the image recordation on the present sheet 12 is completed on the basis of information on the size of the sheet 12 and the print data which are contained in the print command (S80).

In the step S80, in a case where the image recordation on the present sheet 12 has not yet been finished (S80: No), the controller 130 performs the conveying process (S90). In the conveying process, the controller 130 drives the conveyer motor 101 to rotate the pair of conveyer rollers 59 and the pair of discharge rollers 44 to thus convey the sheet 12 by a predetermined amount of line feed.

During execution of the conveying process (S90), similar to the step S20, the controller 130 refers to the print data to determine the ink count value corresponding to an amount of ink to be ejected in the next printing process (S70). The controller 130 adds the determined ink count value to the present ink count value. Then, the process from steps S30 to S80 is performed again.

Thereafter, as long as the processes in steps S40 and S50 are not performed, the ink count value is increased each time the printing process (S70) is performed and the counted elapsed time is also increased. Therefore, the ink count value may become not less than the ink threshold value (S30: Yes) and the elapsed time may become longer than the predetermined time period (S40: Yes). In such a case, the carriage 40 is moved to the maintenance position once to move the valve 89 to the opening position. Hence, the internal space 81 becomes communicated with the atmosphere (S40), whereby the inner pressure of the internal space 81 becomes equal to the atmospheric pressure.

Incidentally, the update of the ink count value and subsequent steps S30 through S60 are performed in parallel to the conveying process. In a case where one of the above two processes (i.e., the update of the ink count value and subsequent steps S30 through S60; and the conveying process) is completed before the remaining one of the above two processes is completed, the controller 130 waits for the remaining one to be completed and then performs the printing process (S70). In other words, the process of moving the valve 89 from the closing position to the opening position (S40) is performed after the completion of a preceding printing process and before the start of a subsequent printing process.

In step S80, in a case where the image recordation on the present sheet 12 is completed (S80: Yes), the controller 130 controls the pair of conveyer rollers 59 and the pair of discharge rollers 44 to convey the sheet 12 in the conveying direction 15 to discharge the sheet 12 onto the discharge tray 21 (S100).

Next, the controller 130 determines whether there remains image data that has not yet been record on the sheet 12 in the image data contained in the printing command. In other words, the controller 130 determines whether image recordation on the next page is necessary (S110).

In a case where image recordation for the next page is required (S110: Yes), the controller 130 performs the process of feeding a subsequent sheet 12 from the sheet tray 20 to the sheet conveying passage 65 and then performs the cueing process (S20). Incidentally, the process of feeding a subsequent sheet 12 (S20) may be performed in parallel to the process of discharging a preceding sheet 12 (S100).

In a case where image recordation for the next page is not necessary (S110: No), the controller 130 terminates the series of image recordation control.

[Effect Exhibited in the Embodiment]

According to the present embodiment, the controller 130 maintains the valve 89 at the closing position while the head 38 is ejecting ink from the nozzles 39 toward the sheet 12. Therefore, even if unintentional ejection of ink from the nozzles 39 occurs in this state, the level of the negative pressure in the interior of the storage portion 80 rises in accordance with the unintentional ink ejection, and hence, the unintentional ink ejection can be stopped.

Further, in accordance with an increase in ink ejection amount after the valve 89 is closed, the negative pressure in the interior of the storage portion 80 is elevated, which may lead to breakage of the meniscus. However, according to the present embodiment, the valve 89 is opened when the ink ejection amount after the valve 89 is closed reaches the ink threshold value. Therefore, the level of the negative pressure in the interior of the storage portion 80 can be lowered, and accordingly, breakage of the meniscus can be prevented.

Further, the smaller the residual amount of ink in the interior of the storage portion 80 becomes, the greater the ratio of gas (such as air) in the storage portion 80 to the internal volume thereof becomes. Therefore, the rising rate in the negative pressure in the storage portion 80 to the ejection of ink from the storage portion 80 becomes lowered. That is, the amount of ejected ink required for the negative pressure in the storage portion 80 to reach a negative pressure level that causes breakage of meniscus becomes greater as the residual amount in the storage portion 80 becomes smaller. However, according to the present embodiment, in a case where the amount of ejected ink required for the negative pressure in the storage portion 80 to reach a negative pressure level that causes breakage of meniscus is large, i.e., in a case where the residual amount of ink is small, the ink threshold value is set to a large value. In such a situation, the frequency of moving the valve 89 to the opening position becomes lower. As a result, the frequency of interruption of ink ejection to the sheet 12 due to the movement of the valve 89 to the opening position can be lowered, which prevents the speed of image recordation on the sheet 12 from lowering.

Further, in a print job in which image recordation is performed to at least one sheet 12, the printing process is normally performed multiple times. According to the present embodiment, the ink count value is updated each time the printing process is performed. That is, the ink count value is updated frequently. If the ink count value were updated at long intervals, the possibility would increase that elevation in the level of the negative pressure in the internal space 81 of the storage portion 80 is not detected and the ink meniscuses formed at the ejecting openings of the nozzles 39 are broken. However, in the present embodiment, the ink count value is frequently updated and thus breakage of the meniscuses is less likely to occur.

Further, according to the present embodiment, since the ink count value is updated each time the printing process is performed, determination whether the ink count value exceeds the ink threshold vale can be performed before the printing process is performed. Hence, interruption of the ink ejection toward the sheet 12 caused by the valve 89 being moved to the opening position due to the ink count value exceeding the ink threshold value during execution of the printing process can be prevented. As a result, the lowering in speed of image recordation on the sheet 12 can be suppressed. Further, assuming that the ink ejection to the sheet 12 is temporarily interrupted, turbulence of the recording result (printed image) may occur unless control of the position of the carriage 40 and control of the restart of ink ejection are precisely performed in restarting the printing process. Against this, in the present embodiment, since interruption of ink ejection to the sheet 12 does not occur, the above-described turbulence of the recording result can be prevented from occurring.

Further, if the valve 89 were moved from the closing position to the opening position during execution of the printing process and the level of the negative pressure in the storage portion 80 changed, turbulence of ink ejection from the head 38 to the sheet 12 would occur and thus the quality in the image recorded on the sheet 12 would be degraded. Against this, such degradation does not occur in the present embodiment, since movement of the valve 89 from the closing position to the opening position is performed in an interval between the preceding printing process and the subsequent printing process.

Further, according to the present embodiment, the conveying process and the process of moving the valve 89 from the closing position to the opening position are performed in parallel. Hence, a faster speed of image recordation on the sheet 12 can be realized.

Further, in accordance with increase in the amount of ink ejected after the valve 89 is closed, the negative pressure in the storage portion 80 is elevated and thus the possibility of breakage of the meniscus increases. The ink ejection amount is likely to have become larger as the time period that has elapsed since the closing of the valve 89 becomes longer. Against this, in the present embodiment, the valve 89 is opened when the elapsed time period from the closing of the valve 89 becomes longer than the predetermined time period. That is, the valve 89 is opened when the ink ejection amount is likely to have become large.

Further, according to the present embodiment, a function of moving the valve 89 can be realized by a simple structure that the abutment member 51 pushes the valve 89 in accordance with movement of the carriage 40.

[Modifications]

According to the above-described embodiment, the ink count value is reset to the initial value (zero) at the timing at which the valve 89 starts to be moved from the opening position to the closing position in S50. However, the timing of resetting the ink count value is not limited to the above timing, and the controller 130 may reset the ink count value at any timing within a period of time from the time of the completion of the printing process performed in S70 immediately before the movement of the valve 89 from the closing position to the opening position is performed in the process from S40 to S50 to the time of the start of the printing process performed in S70 immediately after the movement of the valve 89 from the closing position to the opening position is performed in the process from S40 to S50.

In the above-described embodiment, the elapsed time is reset at the time at which the movement of the valve 89 from the closing position to the opening position is completed in the process from S40 to S50. However, the timing of resetting the elapsed time is not limited to the above timing, and the controller 130 may reset the elapsed time at any timing within a period of time from a time when the movement of the valve 89 from the closing position to the opening position is completed in the process from S40 to S50 to a time when the movement of the valve 89 back to the closing position from the opening position is completed in S50.

Moreover, according to the above-described embodiment, the elapsed time is the time period that has elapsed since the timing at which the movement of the valve 89 back to the closing position from the opening position is started in S50. However, the elapsed time is not limited to the above time period, and any time period may be employed as the elapsed time as long as the time period is based on a period of time for which the valve 89 stays at the closing position. More specifically, the elapsed time may be a time period that has elapsed since a predetermined timing within a period of time from the time of the start of the movement of the valve 89 back to the closing position from the opening position in S50 to the time of the start of the printing process that is performed immediately after the movement of the valve 89 back to the closing position from the opening position is performed in S50, provided that the predetermined timing is a timing after the previously counted elapsed time is reset.

For example, instead of the timings employed in the above-described embodiment, the ink count value may be reset at the timing at which the movement of the valve 89 from the closing position to the opening position is completed in the process from S40 to S50, the elapsed time may be reset at the timing at which the movement of the valve 89 back to the closing position from the opening position is started in S50, and an elapsed time may start to be counted from the timing at which the movement of the valve 89 back to the closing position from the opening position is completed in S50.

According to the above-described embodiment, the ink count value is reset to the initial value (zero) at the timing at which the valve 89 starts to be moved from the opening position to the closing position in step S50. However, when the valve 89 starts to be moved from the opening position to the closing position in step S50, the ink count value at the time of the start of the movement of the valve 89 from the opening position to the closing position may be set (or stored) as a reference value, instead of resetting the ink count value to the initial value (i.e., zero). In this case, the controller 130 compares the difference between the present ink count value and the reference value with the ink threshold value in S30. This comparison is different from the comparison performed in the above-described embodiment in which the ink count value itself is compared with the ink threshold value in S30. Incidentally, since the reference value is set to a value differing depending on the situation, the reference value is stored in the RAM 133 or the EEPROM 134. The ink count value at the time of the start of the movement of the valve 89 from the opening position to the closing position in the above modification is an example of the specific ink count value.

Note that the ink count value set (or stored) as the reference value is not limited to the ink count value at the above timing, i.e., the ink count value at the time of the start of the movement of the valve 89 from the opening position to the closing position, and the ink count value at any timing within a period of time from the time of the completion of the printing process performed in S70 immediately before the movement of the valve 89 from the closing position to the opening position is performed in the process from S40 to S50 to the time of the start of the printing process performed in S70 immediately after the movement of the valve 89 from the closing position to the opening position is performed in the process from S40 to S50 is available as the reference value. This is because the ink count value is unchanged (i.e., is not updated) in the period of time from the time of the completion of the printing process performed in S70 immediately before the movement of the valve 89 from the closing position to the opening position is performed in the process from S40 to S50 to the time of the start of the printing process performed in S70 immediately after the movement of the valve 89 from the closing position to the opening position is performed in the process from S40 to S50. For example, instead of the ink count value at the time of the start of the movement of the valve 89 from the opening position to the closing position, the ink count value at the time of the completion of the printing process performed in S70 immediately before the movement of the valve 89 from the closing position to the opening position is performed in the process from S40 to S50 may be set (or stored) as the reference value.

In the above-described embodiment, in steps S20 and S90 the controller 130 determines, on the basis of the print data, the ink count value (the number of times of ejection of ink droplets which is to be ejected in the next printing process)

corresponding to the amount of ink to be ejected in the next printing process. That is, the controller 130 estimates the amount of ink to be ejected on the basis of the print data. However, the controller 130 may determine, on the basis of the number of times of ejection of ink droplet actually performed in the most recent printing process, the ink count value corresponding to the amount of ink actually ejected in the most recent printing process. In the latter case, in steps S20 and S90 the controller 130 does not calculate the ink count value, but after ink is actually ejected in S70, the controller 130 calculates the ink count value on the basis of the number of times of ejection of ink droplet actually performed. Accordingly, in this case, the process from steps S30 to S60 may be performed after step S70.

In the above-described embodiment, the number of times of ejections of ink droplets calculated on the basis of the print data is the ink count value corresponding to the amount of ink to be ejected in the next printing process. However, the ink count value need not necessarily be the number of times of ejections of ink droplets. For example, the ink count value may be an amount of ink estimated form the print data.

In the above-described embodiment, the actuation mechanism 50 for moving the valve 89 includes the abutment member 51, the coil spring 90, and the carriage 40. With this structure, in accordance with movement of the carriage 40 to the maintenance position, the abutment member 51 pushes the valve 89 to move the same from the closing position to the opening position, and in accordance with movement of the carriage 40 from the maintenance position, the valve 89 is moved from the opening position to the closing position by the urging force of the coil spring 90. However, the actuation mechanism 50 is not limited to such a configuration.

For example, the valve 89 may be an electromagnetic valve. In the latter case, the electromagnetic valve includes a solenoid configured to convert electric current supplied from the controller 130 into a mechanical motion, and a valve 89 movable by the mechanical motion. The solenoid corresponds to the actuation mechanism 50. Incidentally, the structure of the electromagnetic valve per se is known in the art, and therefore, further description thereto will be omitted.

In the above-described embodiment, the valve 89 is positioned at the opening position only when the carriage 40 is positioned at the maintenance position. On the other hand, in a case where the solenoid is employed as the actuation mechanism 50, the valve 89 can be moved to the opening position regardless of the position of the carriage 40. However, as described below with reference to the flowchart illustrated in FIG. 8, it is preferable that the valve 89 is moved to the opening position only when a predetermined condition is met.

Figure 7:
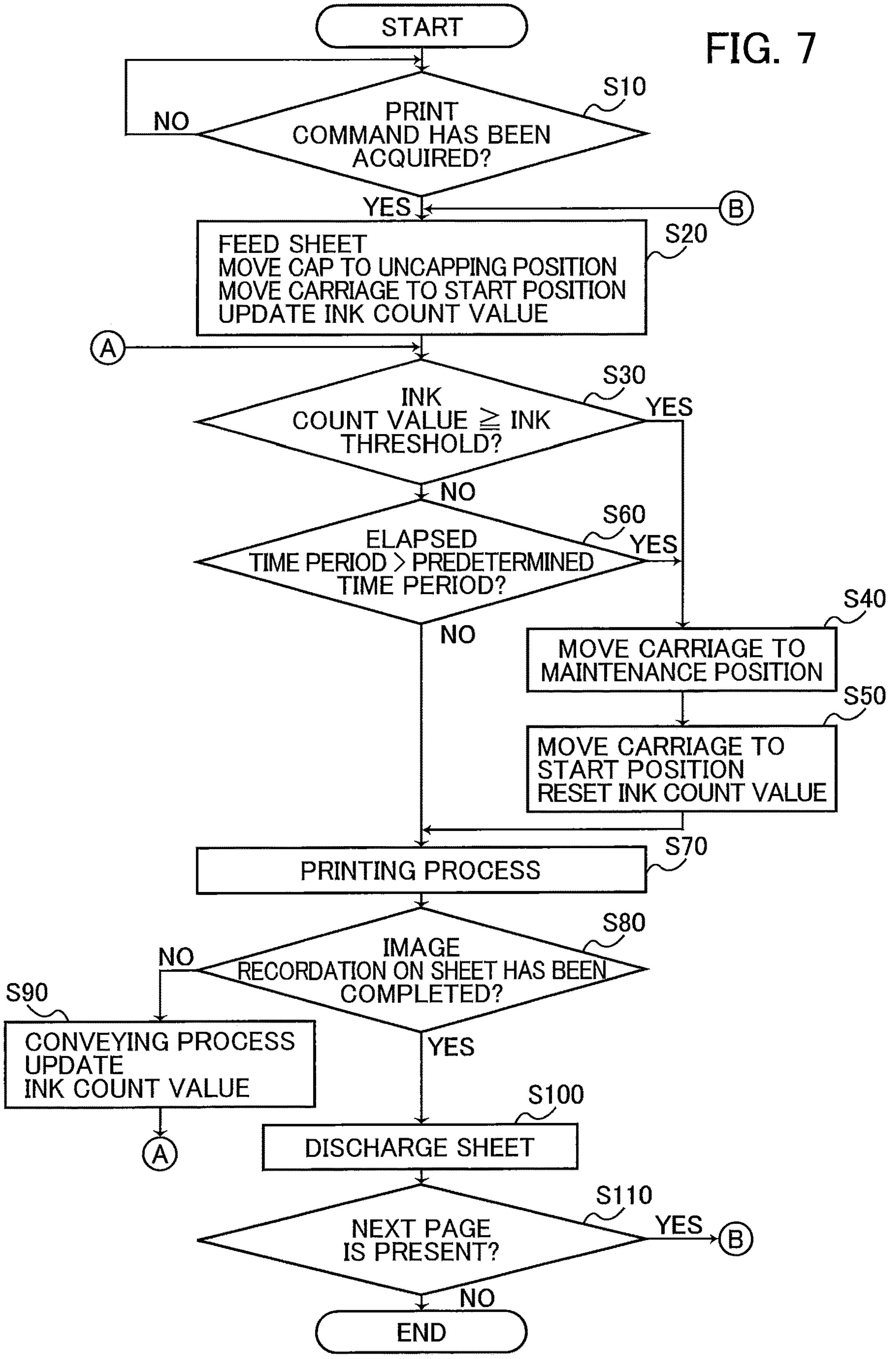
FIG. 7 is a flowchart illustrating steps in image recordation control.
Figure 8:
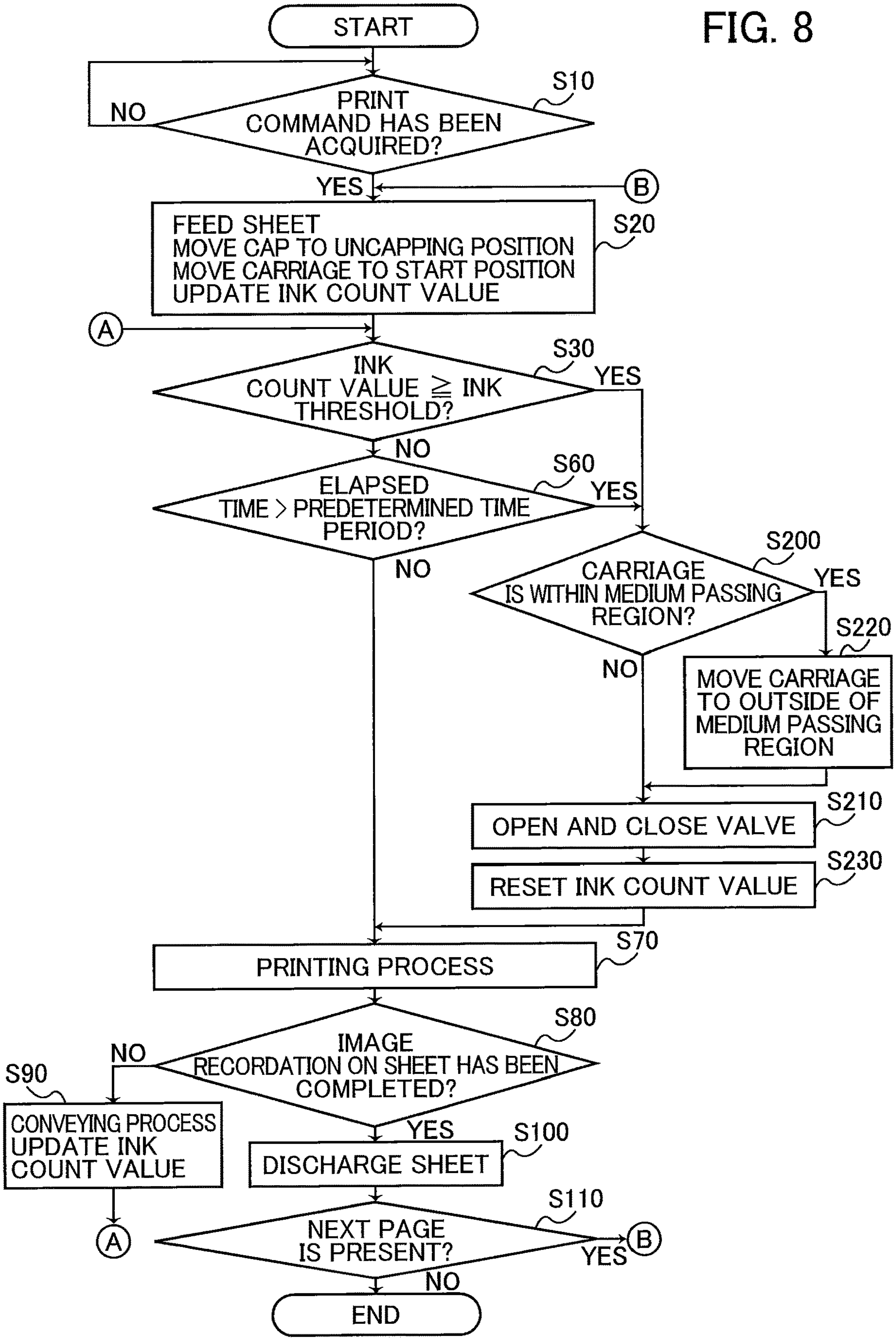
FIG. 8 is a flowchart illustrating steps in image recordation control performed in a modification of the embodiment.

In the flowchart illustrated in FIG. 8, steps S200 through S230 are executed instead of steps S40 and S50 in the flowchart of FIG. 7.

That is, in a case where the ink count value is not less than the ink threshold value (S30: Yes), the controller 130 determines whether the present position of the carriage 40 is within the medium passing region 36 on the basis of the pulse signal (the electric signal) received from the encoder 35 (S200).

In a case where the carriage 40 is positioned outward of the medium passing region 36 in the left-right direction 9, that is, in a case where the carriage 40 is positioned rightward or leftward of the medium passing region 36 (S200: No), the controller 130 controls the solenoid to move the valve 89 to the opening position once and then returns the valve 89 to the closing position (S210). On the other hand, in a case where the carriage 40 is positioned within the medium passing region 36 in the left-right direction 9 (S200: Yes), the controller 130 moves the carriage 40 to a position outward of the medium passing region 36 (S220), and thereafter the controller 130 controls the solenoid to move the valve 89 to the opening position once and then returns the valve 89 to the closing position (S210). After step S210, the controller 130 resets the elapsed time and ink count value, and starts counting an elapsed time (S230).

In summary, the controller 130 controls the solenoid to move the valve from the closing position to the opening position in a state where the nozzles 39 (the head 38) are positioned outward of the medium passing region 36 in the left-right direction 9.

According to the modification described above, the valve 89 is moved to the opening position in a state where the nozzles 39 are positioned outward of the medium passing region 36 in the left-right direction 9. Therefore, even if ink is leaked from the nozzles 39 due to the valve 89 being opened in a state where the meniscuses are broken, adhesion of the leaked ink to the sheet 12 can be reduced.

Incidentally, also in a case where the elapsed time from the timing at which the valve 89 starts to be moved from the opening position to the closing position is longer than the predetermined time period (S60: Yes), step S200 and steps subsequent thereto are performed.

Further, the carriage may be moved rightward of the medium passing region 36 in step S220. Alternatively, the carriage may be moved leftward of the medium passing region 36 in step S220.

For example, in step S220, the carriage 40 may be moved rightward in a case where the carriage is presently positioned at the right portion of the medium passing region 36, and may be moved leftward in a case where the carriage is presently positioned at the left portion of the medium passing region 36.

Further, for example, in step S220, the carriage 40 may be moved to one of the left side and the right side of the medium passing region 36, where the cap 70 is positioned (in the present embodiment, the carriage 40 is moved to the right side of the medium passing region 36). That is, the controller 130 may move the valve 89 to the opening position (S210) after bringing the nozzles 39 of the head 38 into a state where the nozzles 39 face the cap 70. In other words, the controller 130 may control the solenoid and the like to move the valve 89 from the closing position to the opening position in a state where the nozzles 39 face the cap 70.

According to the above-described modification, the valve 89 is moved to the opening position in a state where the nozzles 39 face the cap 70. Therefore, even if ink is leaked from the nozzles 39 due to the valve 89 being opened in a state where the meniscuses broken, the cap 70 can receive the leaked ink. Hence, adhesion of the leaked ink to a remaining portion of the multifunction peripheral 10 can be reduced.

According to the above-described embodiment, the controller 130 performs comparison of the ink count value with the ink threshold value (S30) once each time the printing process is performed once (i.e., at every pass operation). However, the comparison between the ink count value and the ink threshold value may be performed at timings other than every printing process (every pass operation). For example, the comparison may be performed at every image recordation on one sheet 12, i.e., page by page basis, or may be performed once for one print command, i.e., at every print command.

Further, for example, the comparison between the ink count value and the ink threshold value may be performed during the printing process. In the latter case, in a case where the ink count value becomes not less than the ink threshold value during printing process, the controller 130 may suspend the printing process and open the valve 89, or the controller 130 may open the valve 89 after completion of the current printing process and prior to the start of the next printing process similar to the above-described embodiment.

In the above-described embodiment, a serial head type in which an image is recorded on a sheet while the head 38 is being moved by the carriage 40 is employed as an image recording system. However, a line head type is also available in which the recording unit 24 does not include the carriage 40 and an image is recorded on a sheet without moving the head 38. In a case where the line head type is employed, the head 38 extending over the length from the right edge to the left edge of the medium passing region 36 is provided. Further, the conveying process and the printing process are performed in parallel and continuously. That is, ink droplets are continuously ejected from the nozzles 39 while the sheet 12 is being conveyed. Further, the head 38 is fixed to a frame of the housing 14 in the line head type. This frame is an example of the support member.

In this case, the controller 130 controls the actuation mechanism 50 such as a solenoid to move the valve 89 from the closing position to the opening position in a state where the sheet 12 does not face the nozzles 39 in the up-down direction 7. For example, in a case where the ink count value becomes not less than the ink threshold value as a result of counting up the ink count value while the ink droplets are ejected in the printing process, the controller 130 continues image recordation with respect to the present sheet 12 and discharges the sheet 12 upon completion of the image recordation to the present sheet 12. Then, after no sheet 12 becomes present below the nozzles 39 because of the discharge of the present sheet 12, the controller 130 controls the actuation mechanism 50 to move the valve 89 from the closing position to the opening position.

According to the above-described modification, the valve 89 is moved to the opening position in a state where the sheet 12 does not face the nozzles 39. Therefore, even if ink is leaked from the nozzles 39 by opening the valve 89 in a state where the ink meniscuses are broken, adhesion of leaked ink to the sheet 12 can be reduced.

Figure 9:
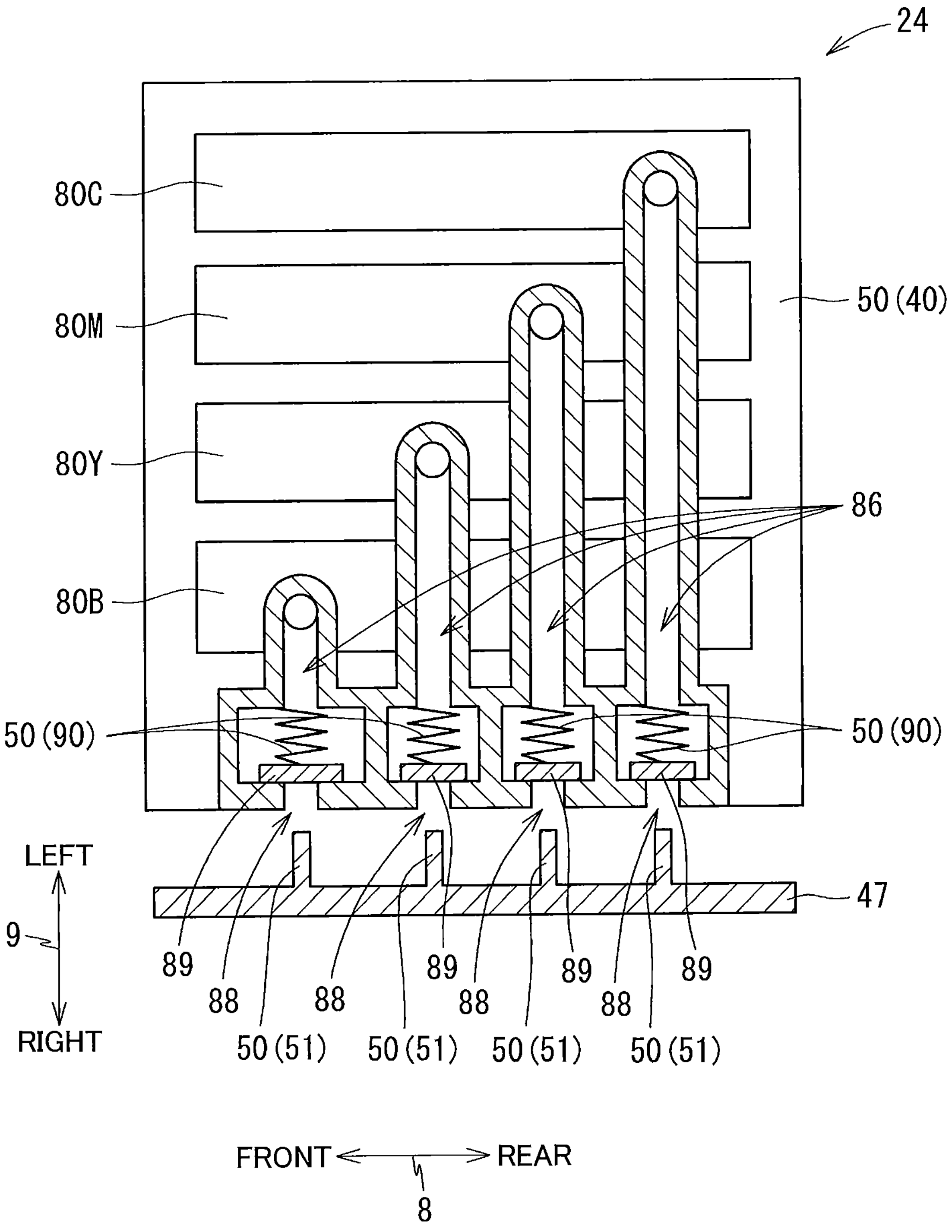
FIG. 9 is a cross-sectional view taken along a plane perpendicular to an up-down direction 7 of a recording unit 24 and an actuation mechanism 50 in a modification of the embodiment.

In the above-described embodiment, the storage portion 80 is singular. However, a plurality of storage portions 80 may be provided. For example, as illustrated in FIG. 9, the recording unit 24 may include four storage portions 80C, 80M, 80Y, 80B.

The storage portion 80C stores therein cyan ink. The storage portion 80M stores therein magenta ink. The storage portion 80Y stores therein yellow ink. The storage portion 80B stores therein black ink. The storage portions 80C, 80M, 80Y, 80B are arrayed in the left-right direction 9 in this order. Incidentally, the storage portions 80C, 80M, 80Y, 80B may be arrayed in a direction other than the left-right direction 9 such as in the front-rear direction 8. Further, the arrangement order of the storage portions 80C, 80M, 80Y, 80B is not limited to the order illustrated in FIG. 9. Further, the sizes of the storage portions 80C, 80M, 80Y, 80B may be equal to one another or may be different from one another.

The air communication opening 88 is formed in each of the storage portions 80C, 80M, 80Y, 80B. The air communication openings 88 are arrayed in the front-rear direction 8. The distances in the left-right direction 9 between the four air communication openings 80 and the body portions of the corresponding storage portions 80C, 80M, 80Y, 80B are different from one another among the storage portions 80C, 80M, 80Y, 80B. Therefore, the lengths of the valve accommodation spaces 86 allowing the corresponding air communication openings 88 and the corresponding body portions are different from one another among the storage portions 80C, 80M, 80Y, 80B. The valve 89 and the coil spring 90 are disposed in each valve accommodation space 86 similar to the above-described embodiment.

The abutment member 51 includes four protrusions 52 arrayed in the front-rear direction 8. The four protrusions 52 correspond one-to-one with the four air communication openings 88 of the storage portions 80C, 80M, 80Y, 80B. In a process in which the carriage 40 is moved from a position above the platen 42 to the maintenance position, the protrusions 52 are simultaneously inserted into the corresponding air communication openings 88 from the right to push the corresponding valves 89. Hence, each valve 89 is moved from their closing position to their opening position against the urging force of the corresponding coil spring 90. That is, all the air communication openings 88 are simultaneously opened. On the other hand, when the carriage 40 is moved leftward from the maintenance position, each valve 89 is separated away from the corresponding protrusion 52, so that all the valves 89 are simultaneously moved from their opening position to their closing position by the urging force of the corresponding coil springs 90. That is, all the air communication openings 88 are open in a state where the valves 89 are at their opening position, and all the air communication openings 88 are closed in a state where the valves 89 are at their closing position.

The memory 140 stores therein four ink count values that correspond one-to-one with the four storage portions 80C, 80M, 80Y, 80B. The controller 130 compares the four ink count values with the ink threshold value in step S30 in the image recordation control. In a case where at least one of the four ink count values becomes greater than or equal to the ink threshold value (S30: Yes), the controller 130 moves the carriage 40 to the maintenance position (S40) to move the valves 89 from their closing position to their opening position.

Alternatively, in step S30, the controller 130 may calculate differences between the four ink count values and the reference value (i.e., calculate four differences: a difference between the ink count value for the storage portion 80C and the reference value, a difference between the ink count value for the storage portion 80M and the reference value, a difference between the ink count value for the storage portion 80Y and the reference value, a difference between the ink count value for the storage portion 80B and the reference value) and then compare the calculated four differences with the ink threshold value. In a case where at least one of the four differences becomes greater than or equal to the ink threshold value (S30: Yes), the controller 130 moves the carriage 40 to the maintenance position (S40) to move the valves 89 from their closing position to their opening position. Incidentally, the reference value and the ink threshold value may be provided for each color, i.e., for each of the storage portions 80C, 80M, 80Y, and 80B.

According to the above-described modification, since the controller 130 collectively controls the air communication openings 88 corresponding one-to-one with the storage portions 80, facilitated control is achievable in comparison with a case where the controller 130 individually controls the air communication openings 88.

Further, in the above-described modifications, the ink count values corresponding one-to-one with the storage portions 80 are collectively reset to the initial value (or updated with the reference value), the frequency of movement of the valve 89 from the closing position to the opening position can be reduced in comparison with a case where the air communication openings 88 corresponding one-to-one with the storage portions 80 are individually controlled. Accordingly, the frequency of interruption of ink ejection to the sheet 12 due to movement of the valve 89 to the opening position can be lowered, thereby suppressing the image recordation speed from lowering.

Note that, in the above-described modifications, the four valves 89 are provided in one-to-one correspondence with the four air communication openings 88 (i.e., the four storage portions 80C, 80M, 80Y, and 80B). However, instead of the four valves 89, a single valve 89 common to all the four air communication openings 88 may be employed for simultaneously closing and opening all the four air communication openings 88.

Incidentally, in a case where a plurality of storage portions 80 are provided, the actuation mechanism 50 may be configured of a single solenoid and the like and the single solenoid may move the plurality of valves 89, or the actuation mechanism 50 may be configured of a plurality of solenoids and the like and the plurality of solenoids may move the plurality of valves 89 at the same timing or different timings.

In the above-described embodiment, the storage portion 80 is assembled to the carriage 40, and replenishment of ink is performed by injecting ink through the ink inlet 83. However, the storage portion 80 is not limited to such a configuration. For example, the storage portion 80 may be a cartridge attachable to and detachable from the carriage 40. In the latter case, the cartridge is replaced with a new cartridge when ink in the cartridge has become low or run out.

In the above-described embodiment, the storage portion 80 is supported by the carriage 40. However, the storage portion 80 need not necessarily be supported by the carriage 40. For example, the storage portion 80 may be disposed at a portion of the multifunction peripheral 10 different from the disposed position of the carriage 40. In the latter case, the storage portion 80 and the head 38 is connected to each other by a tube, and ink stored in the storage portion 80 is supplied to the head 38 through the tube and the like. Further, in this case, at least a part of the storage portion 80 is positioned above the head 38.

While the description has been made in detail with reference to the specific embodiment and modifications, it would be apparent to those skilled in the art that various changes and modifications may be made thereto.

What is claimed is:

1. An inkjet recording device comprising:

a head comprising a nozzle and configured to eject ink from the nozzle;

a support member supporting the head;

a storage portion configured to store therein ink, the storage portion having a part positioned above the nozzle, the storage portion having a communication opening allowing an interior of the storage portion to be communicated with an outside of the storage portion;

a valve movable between:

an opening position in which the valve is separated from the communication opening to open the communication opening; and a closing position in which the valve is seated on the communication opening to close the communication opening;

an actuator configured to move the valve; and a controller configured to perform:

controlling, while the head is ejecting ink from the nozzle toward a recording medium, the actuator to maintain the valve at the closing position.

2. The inkjet recording device according to claim 1, further comprising a memory for storing therein an ink count value, a reference value, and an ink threshold value, the ink count value being updated on the basis of an amount of ink that is ejected from the head, wherein the controller is configured to further perform:

executing a printing process of controlling the head to eject ink from the nozzle while moving the support member in a scanning direction; and in a case where a difference between the ink count value and the reference value reaches the ink threshold value, controlling the actuator to move the valve from the closing position to the opening position; and storing a specific ink count value in the memory as the reference value, the specific ink count value being the ink count value at the time of the completion of the printing process that is executed immediately before the controlling the actuator to move the valve is performed.

3. The inkjet recording device according to claim 2, wherein the storage portion comprises a plurality of storage portions, wherein the communication opening comprises a plurality of communication openings corresponding one-to-one with the plurality of storage portions, wherein all of the plurality of communication openings are open when the valve is at the opening position, and all of the plurality of communication openings are closed when the valve is at the closing position, wherein the ink count value comprises a plurality of ink count values corresponding one-to-one with the plurality of storage portions, and wherein the controlling the actuator to move the valve is performed in a case where at least one of differences between the plurality of ink count values and the reference value reaches the ink threshold value.

4. The inkjet recording device according to claim 2, wherein the controller is configured to further perform:

calculating a residual ink amount on the basis of a volume of the storage portion and the ink count value, the residual ink amount being an amount of ink remaining in the storage portion; and setting the ink threshold value to a larger value as the calculated residual ink amount is smaller.

5. The inkjet recording device according to claim 2, wherein the executing the printing process is repeatedly performed by the controller, and wherein the controller is configured to further perform:

estimating an ink ejection amount on the basis of received print data, the ink ejection amount being an amount of ink to be ejected in the next printing process; and updating the ink count value on the basis of the estimated ink ejection amount.

6. The inkjet recording device according to claim 1, further comprising a memory for storing therein an ink count value, a reference value, and an ink threshold value, the ink count value being updated on the basis of an amount of ink that is ejected from the head, wherein the controller is configured to perform:

in a case where the ink count value reaches the ink threshold value, resetting the ink count value to an initial value; and controlling the actuator to move the valve from the closing position to the opening position.

7. The inkjet recording device according to claim 6, wherein the storage portion comprises a plurality of storage portions, wherein the air communication opening comprises a plurality of air communication openings corresponding one-to-one with the plurality of storage portions, wherein all of the plurality of air communication openings are open when the valve is at the opening position, and all of the plurality of air communication openings are closed when the valve is at the closing position, wherein the ink count value comprises a plurality of ink count values corresponding one-to-one with the plurality of storage portions, and wherein the controlling the actuator to move the valve is performed in a case where at least one of the plurality of ink count values reaches the ink threshold value.

8. The inkjet recording device according to claim 6, wherein the controller is configured to further perform:

executing a printing process of controlling the head to eject ink from the nozzle while moving the support member in a scanning direction, and wherein the resetting is performed at a predetermined timing within a period of time from the time of the completion of the printing process that is executed immediately before the controlling the actuator to move the valve is performed to the time of the start of the printing process that is executed immediately after the controlling the actuator to move the valve is performed.

9. The inkjet recording device according to claim 1, wherein the support member is movable in a scanning direction, and wherein the controller is configured to further perform:

repeatedly executing a printing process of controlling the head to eject ink from the nozzle while moving the support member in the scanning direction.

10. The inkjet recording device according to claim 9, wherein the controller is configured to further perform:

controlling, after the preceding printing process is completed and before the next printing process is started, the actuator to move the valve from the closing position to the opening position.

11. The inkjet recording device according to claim 10, further comprising a conveying unit configured to convey the recording medium, wherein the controller is configured to further perform:

executing a conveying process of controlling the conveying unit to convey the recording medium by a predetermined amount of line feed, wherein the conveying process and the printing process are alternately performed, and wherein the conveying process and the controlling the actuator to move the valve are performed in parallel.

12. The inkjet recording device according to claim 1, wherein the controller is configured to further perform:

controlling, in a case where a specific time period becomes longer than a predetermined time period, the actuator to move the valve from the closing position to the opening position, the specific time period being a time period based on a period of time for which the valve stays at the closing position.

13. The inkjet recording device according to claim 12, wherein the controller is configured to further perform:

executing a printing process of controlling the head to eject ink from the nozzle while moving the support member in a scanning direction, and wherein the specific time period is an elapsed time period that has elapsed since a specific timing, the specific timing being a predetermined timing within a period of time from the time of the start of movement of the valve from the opening position to the closing position to the time of the start of the printing process performed immediately after the movement of the valve from the opening position to the closing position.

14. The inkjet recording device according to claim 1, wherein the head is configured to eject ink downward, and wherein the controller is configured to further perform:

controlling, in a state where the recording medium does not face the nozzle in an up-down direction, the actuator to move the valve from the closing position to the opening position.

15. The inkjet recording device according to claim 14, wherein the support member is movable in a scanning direction, wherein the controller is configured to further perform:

executing a printing process of controlling the head to eject ink from the nozzle while moving the support member in the scanning direction, and wherein the controlling the actuator to move the valve is performed in a state where the nozzle is positioned outward of a medium passing region in the scanning direction, the medium passing region being a region through which the recording medium passes.

16. The inkjet recording device according to claim 1, further comprising a cap configured to cover the nozzle and receive ink ejected from the nozzle, wherein the controller is configured to further perform:

controlling, in a state where the nozzle faces the cap, the actuator to move the valve from the closing position to the opening position.

17. The inkjet recording device according to claim 1, wherein the support member is movable in a scanning direction, wherein the actuator comprises:

an urging member urging the valve toward the closing position; and an abutment member positioned outward of a medium passing region in the scanning direction and configured to abut on the valve, the medium passing region being a region through which the recording medium passes, wherein the controller is configured to further perform:

moving the support member to an outside of the medium passing region, and wherein, when the moving the support member to the outside of the medium passing region is performed, the abutment member abuts on the valve to move the valve from the closing position to the opening position against an urging force of the urging member.

18. The inkjet recording device according to claim 1, wherein the storage portion is supported by the support member.

* * * * *